United States Patent
Betz et al.

(10) Patent No.: US 9,492,695 B2
(45) Date of Patent: Nov. 15, 2016

(54) PEDESTAL AND TORQUE BOX ASSEMBLY FOR A FIRE APPARATUS

(71) Applicant: Oshkosh Corporation, Oshkosh, WI (US)

(72) Inventors: Eric Betz, Clintonville, WI (US); David W. Archer, Hortonville, WI (US); Jon J. Morrow, Neenah, WI (US); Don Parshall, Oshkosh, WI (US); Peter K. Kramer, Oshkosh, WI (US); Troy D. Lind, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 106 days.

(21) Appl. No.: 14/552,283

(22) Filed: Nov. 24, 2014

(65) Prior Publication Data
US 2016/0144211 A1    May 26, 2016

(51) Int. Cl.
| | |
|---|---|
| *A62C 27/00* | (2006.01) |
| *B62D 21/00* | (2006.01) |
| *E06C 5/04* | (2006.01) |
| *B62D 21/09* | (2006.01) |

(52) U.S. Cl.
CPC ............ *A62C 27/00* (2013.01); *B62D 21/09* (2013.01); *E06C 5/04* (2013.01)

(58) Field of Classification Search
CPC ............ A62C 27/00; B62D 21/09; E06C 5/04
USPC .................................................. 280/4, 763.1
See application file for complete search history.

(56) References Cited

U.S. PATENT DOCUMENTS

| | | |
|---|---|---|
| 3,346,052 A | 10/1967 | Moore et al. |
| 3,550,146 A | 12/1970 | Eberle |
| 3,675,721 A | 7/1972 | Davidson et al. |
| 3,770,062 A | 11/1973 | Riggs |

(Continued)

FOREIGN PATENT DOCUMENTS

| | | |
|---|---|---|
| CN | 203050481 | 7/2013 |
| DE | 36 40 944 A1 | 6/1988 |

(Continued)

OTHER PUBLICATIONS

Anonymous, "New truck for Lincolnshire-Riverwoods," Chicago Area Fire Departments, Dec. 6, 2010, Retrieved from the Internet at http://chicagoareafire.com/blog/2010/12/06/ on Jan. 26, 2016, 5 pages as printed.

(Continued)

*Primary Examiner* — Jacob Knutson
(74) *Attorney, Agent, or Firm* — Foley & Lardner LLP

(57) ABSTRACT

A quint configuration fire apparatus includes a chassis defining a longitudinal direction, a body assembly coupled to the chassis and having a storage area configured to receive a ground ladder and a fire hose, a pump coupled to the chassis, a water tank coupled to the chassis, a ladder assembly including a plurality of extensible ladder sections, the ladder assembly coupled to the chassis with a pedestal and a torque box, a single front axle coupled to a front end of the chassis, and a single rear axle coupled to a rear end of the chassis. The ladder assembly is extensible to provide a horizontal reach of at least 100 feet and a vertical height of at least 105 feet. The torque box extends along the longitudinal direction and spans the single rear axle thereby transferring loading along the chassis.

17 Claims, 21 Drawing Sheets

(56) References Cited

U.S. PATENT DOCUMENTS

| | | | |
|---|---|---|---|
| 3,789,869 A | 2/1974 | Morris | |
| 4,317,504 A | 3/1982 | Artaud et al. | |
| 4,410,045 A | 10/1983 | Whitman | |
| 4,556,200 A | 12/1985 | Shoemaker | |
| 4,570,973 A | 2/1986 | Ewers et al. | |
| 4,852,690 A | 8/1989 | Salmi | |
| 4,998,982 A | 3/1991 | Arnold et al. | |
| 5,368,317 A * | 11/1994 | McCombs | B62D 21/00 182/66.1 |
| 5,389,031 A | 2/1995 | Sharpe et al. | |
| 5,538,274 A | 7/1996 | Schmitz et al. | |
| 5,820,150 A | 10/1998 | Archer et al. | |
| 5,897,123 A | 4/1999 | Cherney et al. | |
| 6,006,841 A * | 12/1999 | Hunke | A62C 27/00 137/355.2 |
| 6,105,984 A | 8/2000 | Schmitz et al. | |
| 6,193,007 B1 | 2/2001 | Lie | |
| 6,421,593 B1 | 7/2002 | Kempen et al. | |
| 6,516,914 B1 | 2/2003 | Andersen et al. | |
| 6,520,494 B1 | 2/2003 | Andersen et al. | |
| 6,553,290 B1 | 4/2003 | Pillar | |
| 6,561,718 B1 | 5/2003 | Archer et al. | |
| 6,598,702 B1 | 7/2003 | McGillewie et al. | |
| 6,755,258 B1 | 6/2004 | Hunke et al. | |
| 6,757,597 B2 | 6/2004 | Yakes et al. | |
| 6,764,085 B1 | 7/2004 | Anderson | |
| 6,811,161 B1 * | 11/2004 | Anderson | E06C 5/04 182/19 |
| 6,860,332 B1 | 3/2005 | Archer et al. | |
| 6,882,917 B2 | 4/2005 | Pillar et al. | |
| 6,883,815 B2 | 4/2005 | Archer | |
| 6,885,920 B2 | 4/2005 | Yakes et al. | |
| 6,909,944 B2 | 6/2005 | Pillar et al. | |
| 6,922,615 B2 | 7/2005 | Pillar et al. | |
| 6,973,768 B2 | 12/2005 | Samejima et al. | |
| 6,976,688 B2 | 12/2005 | Archer et al. | |
| 6,993,421 B2 | 1/2006 | Pillar et al. | |
| 7,006,902 B2 | 2/2006 | Archer et al. | |
| 7,024,296 B2 | 4/2006 | Squires et al. | |
| 7,055,880 B2 | 6/2006 | Archer | |
| 7,072,745 B2 | 7/2006 | Pillar et al. | |
| 7,100,741 B2 | 9/2006 | Wissler et al. | |
| 7,107,129 B2 | 9/2006 | Rowe et al. | |
| 7,127,331 B2 | 10/2006 | Pillar et al. | |
| 7,162,332 B2 | 1/2007 | Pillar et al. | |
| 7,164,977 B2 | 1/2007 | Yakes et al. | |
| 7,184,862 B2 | 2/2007 | Pillar et al. | |
| 7,184,866 B2 | 2/2007 | Squires et al. | |
| 7,201,255 B1 | 4/2007 | Kreikemeier | |
| 7,234,534 B2 | 6/2007 | Froland et al. | |
| 7,254,468 B2 | 8/2007 | Pillar et al. | |
| 7,274,976 B2 | 9/2007 | Rowe et al. | |
| 7,277,782 B2 | 10/2007 | Yakes et al. | |
| 7,302,320 B2 | 11/2007 | Nasr et al. | |
| 7,308,968 B2 | 12/2007 | Denison | |
| 7,331,586 B2 | 2/2008 | Trinkner et al. | |
| 7,379,797 B2 | 5/2008 | Nasr et al. | |
| 7,387,348 B2 | 6/2008 | Archer et al. | |
| 7,389,826 B2 | 6/2008 | Linsmeier et al. | |
| 7,392,122 B2 | 6/2008 | Pillar et al. | |
| 7,412,307 B2 | 8/2008 | Pillar et al. | |
| 7,439,711 B2 | 10/2008 | Bolton | |
| 7,451,028 B2 | 11/2008 | Pillar et al. | |
| 7,522,979 B2 | 4/2009 | Pillar | |
| 7,555,369 B2 | 6/2009 | Pillar et al. | |
| 7,689,332 B2 | 3/2010 | Yakes et al. | |
| 7,711,460 B2 | 5/2010 | Yakes et al. | |
| 7,715,962 B2 | 5/2010 | Rowe et al. | |
| 7,725,225 B2 | 5/2010 | Pillar et al. | |
| 7,729,831 B2 | 6/2010 | Pillar et al. | |
| 7,756,621 B2 | 7/2010 | Pillar et al. | |
| 7,784,554 B2 | 8/2010 | Grady et al. | |
| 7,792,618 B2 | 9/2010 | Quigley et al. | |
| 7,792,949 B2 | 9/2010 | Tewari et al. | |
| 7,835,838 B2 | 11/2010 | Pillar et al. | |
| 7,848,857 B2 | 12/2010 | Nasr et al. | |
| 7,874,373 B2 | 1/2011 | Morrow et al. | |
| 8,000,850 B2 | 8/2011 | Nasr et al. | |
| 8,095,247 B2 | 1/2012 | Pillar et al. | |
| 8,201,656 B2 | 6/2012 | Archer et al. | |
| 8,215,241 B2 | 7/2012 | Garneau et al. | |
| 8,376,719 B2 | 2/2013 | Grady et al. | |
| 8,413,764 B1 | 4/2013 | Cohen et al. | |
| 8,739,892 B2 | 6/2014 | Moore et al. | |
| 8,839,902 B1 | 9/2014 | Archer et al. | |
| 2002/0117345 A1 * | 8/2002 | Sztykiel | B60K 5/02 180/292 |
| 2003/0158635 A1 | 8/2003 | Pillar et al. | |
| 2003/0195680 A1 | 10/2003 | Pillar | |
| 2004/0133319 A1 | 7/2004 | Pillar et al. | |
| 2004/0155426 A1 | 8/2004 | Wen et al. | |
| 2005/0234622 A1 | 10/2005 | Pillar et al. | |
| 2005/0236226 A1 * | 10/2005 | Salmi | A62C 27/00 182/65.1 |
| 2005/0247524 A1 | 11/2005 | Wissler et al. | |
| 2006/0021764 A1 | 2/2006 | Archer et al. | |
| 2006/0022001 A1 | 2/2006 | Linsmeier et al. | |
| 2006/0032701 A1 | 2/2006 | Linsmeier et al. | |
| 2006/0032702 A1 | 2/2006 | Linsmeier et al. | |
| 2006/0070845 A1 | 4/2006 | Crookston | |
| 2006/0086566 A1 | 4/2006 | Linsmeier et al. | |
| 2006/0213672 A1 | 9/2006 | Mohr | |
| 2007/0205053 A1 | 9/2007 | Isham et al. | |
| 2007/0256842 A1 | 11/2007 | Mohr | |
| 2007/0284156 A1 | 12/2007 | Grady et al. | |
| 2008/0059030 A1 | 3/2008 | Quigley et al. | |
| 2008/0099212 A1 | 5/2008 | Do | |
| 2008/0103651 A1 | 5/2008 | Pillar et al. | |
| 2008/0215700 A1 | 9/2008 | Pillar et al. | |
| 2008/0271901 A1 | 11/2008 | Decker | |
| 2009/0101436 A1 | 4/2009 | Burman et al. | |
| 2009/0218108 A1 * | 9/2009 | Cano | A61G 3/003 169/24 |
| 2010/0200328 A1 | 8/2010 | Savard et al. | |
| 2012/0193109 A1 | 8/2012 | Moore et al. | |
| 2014/0048353 A1 | 2/2014 | Ellis | |
| 2014/0238704 A1 | 8/2014 | Moore et al. | |
| 2014/0334169 A1 * | 11/2014 | Ewert | A62C 27/00 362/485 |
| 2015/0096835 A1 | 4/2015 | Hong et al. | |
| 2015/0120152 A1 | 4/2015 | Lauterjung et al. | |
| 2015/0273252 A1 | 10/2015 | Lenz et al. | |
| 2015/0273253 A1 | 10/2015 | Lenz et al. | |

FOREIGN PATENT DOCUMENTS

| | | |
|---|---|---|
| EP | 0 244 668 | 11/1987 |
| JP | H11-239625 | 9/1999 |
| JP | 2008-297701 | 12/2008 |
| KR | 20110040306 | 4/2011 |
| KR | 101297477 | 8/2013 |

OTHER PUBLICATIONS

Firehouse, "Problems with single axle aerial trucks," Dec. 2, 2009, Retrieved from the Internet at http://www.firehouse.com/forums/t111822/ on Jan. 25, 2016, 15 pages as printed.

Rosenbauer, "Raptor Aerials," Oct. 2, 2014, Retrieved from the Internet at https://web.archive.org/web/20141002023939/http://rosenbaueramerica.com/media/documents/pdf/raptor_eng.pdf on Jan. 25, 2016, 6 pages as printed.

Rosenbauer, "Viper Aerials," Oct. 2, 2014, Retrieved from the Internet at https://web.archive.org/web/20141002023939/http://rosenbaueramerica.com/media/documents/pdf/viper_eng.pdf on Jan. 25, 2016, 8 pages as printed.

International Search Report and Written Opinion for PCT Application No. PCT/US2015/059984, mail date Feb. 10, 2016, 11 pages.

International Search Report and Written Opinion for PCT Application No. PCT/US2015/060034, mail date Feb. 4, 2016, 12 pages.

International Search Report and Written Opinion for PCT Application No. PCT/US2015/060035, mail date Feb. 10, 2016, 16 pages.

(56) References Cited

OTHER PUBLICATIONS

International Search Report and Written Opinion for PCT Application No. PCT/US2015/060036, mail date Feb. 9, 2016, 14 pages.
International Search Report and Written Opinion for PCT Application No. PCT/US2015/060038, mail date Feb. 22, 2016, 16 pages.
International Search Report and Written Opinion for PCT Application No. PCT/US2015/060040, mail date Feb. 9, 2016, 15 pages.
U.S. Appl. No. 08/046,623, filed Apr. 14, 1993, Schmitz et al.
U.S. Appl. No. 09/123,804, filed Jul. 28, 1998, Archer et al.
U.S. Appl. No. 09/364,690, filed Jul. 30, 1999, Kempen et al.
U.S. Appl. No. 10/171,075, filed Jun. 13, 2002, Archer et al.
U.S. Appl. No. 29/162,282, filed Jun. 13, 2002, Archer et al.
U.S. Appl. No. 29/162,344, filed Jun. 13, 2002, Archer et al.
Non-Final Office Action on U.S. Appl. No. 14/552,293 mail date May 10, 2016, 13 pages.
Non-Final Office Action on U.S. Appl. No. 15/089,137 mail date May 12, 2016, 7 pages.

* cited by examiner

PEDESTAL AND TORQUE BOX ASSEMBLY FOR A FIRE APPARATUS

CROSS REFERENCE TO RELATED APPLICATIONS

This application is related to U.S. application Ser. No. 14/552,240, titled "Aerial Ladder for a Fire Apparatus," filed Nov. 24, 2014; U.S. application Ser. No. 14/552,252, titled "Quint Configuration Fire Apparatus," filed Nov. 24, 2014; U.S. application Ser. No. 14/552,260, titled "Turntable Assembly for a Fire Apparatus," filed Nov. 24, 2014; U.S. application Ser. No. 14/552,275, titled "Ladder Assembly for a Fire Apparatus," filed Nov. 24, 2014; and U.S. application Ser. No. 14/552,293, titled "Outrigger Assembly for a Fire Apparatus," filed Nov. 24, 2014, all of which are incorporated herein by reference in their entireties.

BACKGROUND

A quint configuration fire apparatus (e.g., a fire truck, etc.) includes an aerial ladder, a water tank, ground ladders, a water pump, and hose storage. Aerial ladders may be classified according to their horizontal reach and vertical extension height. Traditionally, weight is added to the fire apparatus (e.g., by making the various components heavier or larger, etc.) in order to increase the horizontal reach or vertical extension height of the aerial ladder. Traditional quint configuration fire trucks have included a second rear axle to carry the weight required to provide the desired aerial ladder horizontal reach and vertical extension height. Such vehicles can therefore be more heavy, difficult to maneuver, and expensive to manufacture.

SUMMARY

One embodiment relates to quint configuration fire apparatus. The quint configuration fire apparatus includes a chassis defining a longitudinal direction, a body assembly coupled to the chassis and having a storage area configured to receive a ground ladder and a fire hose, a pump coupled to the chassis, a water tank coupled to the chassis, a ladder assembly including a plurality of extensible ladder sections, the ladder assembly coupled to the chassis with a pedestal and a torque box, a single front axle coupled to a front end of the chassis, and a single rear axle coupled to a rear end of the chassis. The ladder assembly is extensible to provide a horizontal reach of at least 100 feet and a vertical height of at least 105 feet. The torque box extends along the longitudinal direction and spans the single rear axle thereby transferring loading along the chassis.

Another embodiment relates to a fire apparatus. The fire apparatus includes a chassis defining a longitudinal direction, a body assembly coupled to the chassis, a ladder assembly including a plurality of extensible ladder sections, the ladder assembly coupled to the chassis with a pedestal and a torque box, and a single rear axle coupled to a rear end of the chassis. The body assembly is configured to receive a ground ladder, a fire hose, a pump, and a water tank. The ladder assembly is extensible to provide a horizontal reach of at least 100 feet. The torque box extends along the longitudinal direction and spans the single rear axle thereby transferring loading along the chassis.

Another embodiment relates to a method of manufacturing a quint configuration fire apparatus. The method includes providing a chassis, coupling a body assembly to the chassis, the body assembly having a storage area configured to receive a ground ladder, a fire hose, a pump, and a water tank, pivotally coupling a ladder assembly to the chassis with a pedestal and a torque box, the ladder assembly extending to provide a horizontal reach of at least 100 feet, supporting at least a portion of the weight of the chassis, the body assembly, the pump, the water tank, the ladder assembly, the ground ladder, and the fire hose with a single front axle and a single rear axle, and transferring loading along the chassis by positioning the torque box across the single rear axle.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
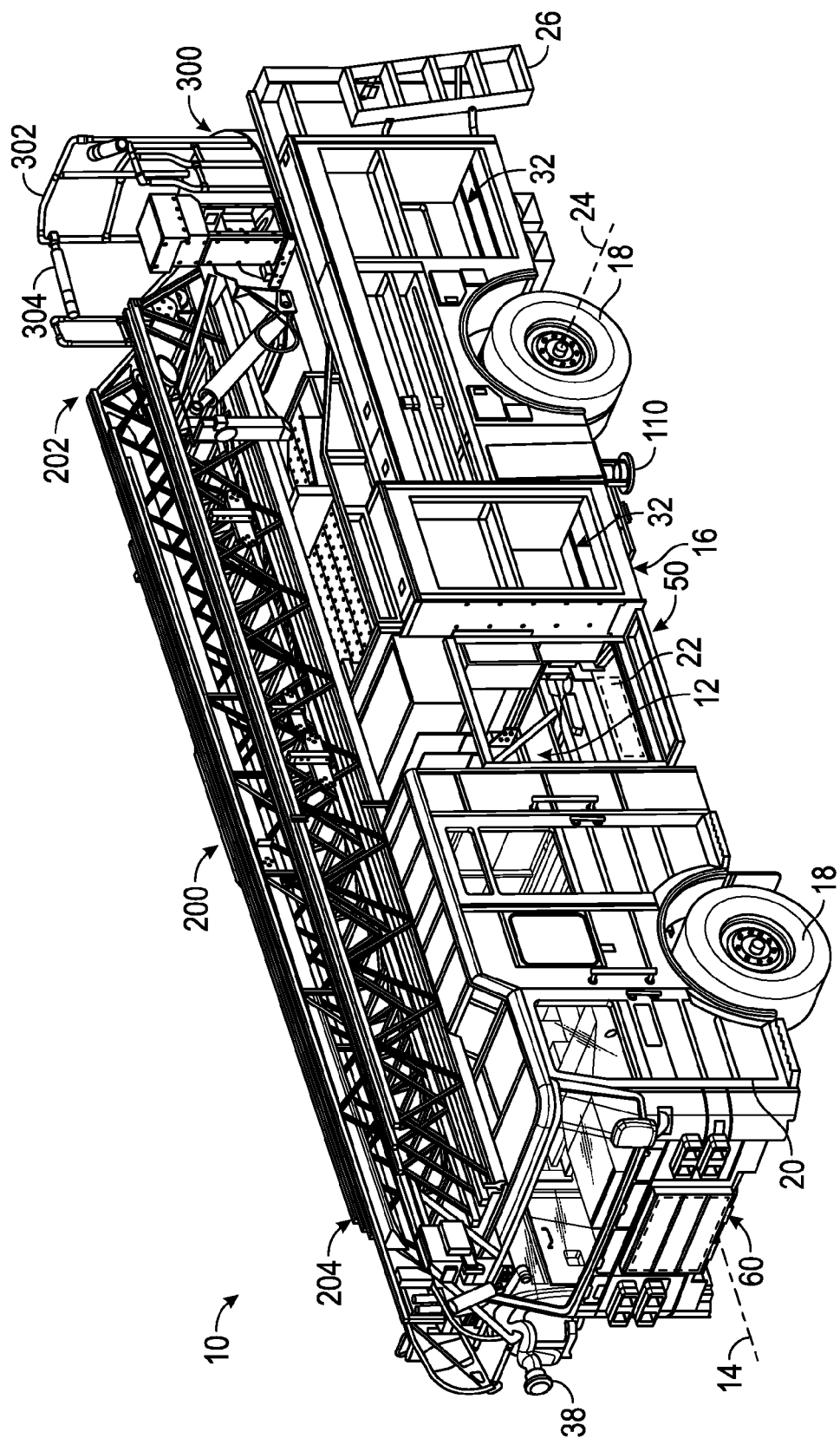
FIG. 1 is a front perspective view of a fire apparatus, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a torque box and a pedestal transfer loading from an aerial ladder assembly along the chassis of a quint configuration fire apparatus. In one embodiment, the torque box and the pedestal extend the horizontal reach and vertical extension height of the aerial ladder assembly. While some traditional quint configuration fire trucks have a ladder assembly mounted on a single rear axle chassis, the ladder assembly of such fire trucks traditionally has a vertical extension height of 75-80 feet and 67-72 feet of horizontal reach. Vertical extension height may include the distance from the upper-most rung of the ladder assembly to the ground when the ladder assembly is fully extended. Reach may include the horizontal distance from the point of rotation (e.g., point of connection of a ladder assembly to a fire apparatus, etc.) to the furthest rung when the ladder assembly is extended. Increasing vertical extension height or horizontal reach is traditionally achieved by increasing the weight of various components (e.g., the aerial ladder assembly, the turntable, etc.). The increased weight, in turn, is traditionally carried by a requisite tandem rear axle. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. According to an exemplary embodiment, the aerial ladder assembly of the quint configuration fire apparatus is operable at a vertical extension height of at least 95 feet (e.g., 105 feet, 107 feet, etc.) and at least 90 feet (e.g., at least 100 feet, etc.) of horizontal reach with a tip capacity of at least 750 pounds. The weight of the chassis and other components is supported by a single rear axle chassis, thereby reducing cost and increasing maneuverability relative to traditional vehicles.

According to the exemplary embodiment shown in FIGS. 1-12, a vehicle, shown as a fire apparatus 10, includes a chassis, shown as a frame 12, that defines a longitudinal axis 14. A body assembly, shown as rear section 16, axles 18, and a cab assembly, shown as front cabin 20, are coupled to the frame 12. In one embodiment, the longitudinal axis 14 extends along a direction defined by at least one of a first frame rail 11 and a second frame rail 13 of the frame 12 (e.g., front-to-back, etc.).

Referring to the exemplary embodiment shown in FIG. 1, the front cabin 20 is positioned forward of the rear section 16 (e.g., with respect to a forward direction of travel for the vehicle along the longitudinal axis 14, etc.). According to an alternative embodiment, the cab assembly may be positioned behind the rear section 16 (e.g., with respect to a forward direction of travel for the vehicle along the longitudinal axis 14, etc.). The cab assembly may be positioned behind the rear section 16 on, by way of example, a rear tiller fire apparatus. In some embodiments, the fire apparatus 10 is a ladder truck with a front portion that includes the front cabin 20 pivotally coupled to a rear portion that includes the rear section 16.

Figure 2:
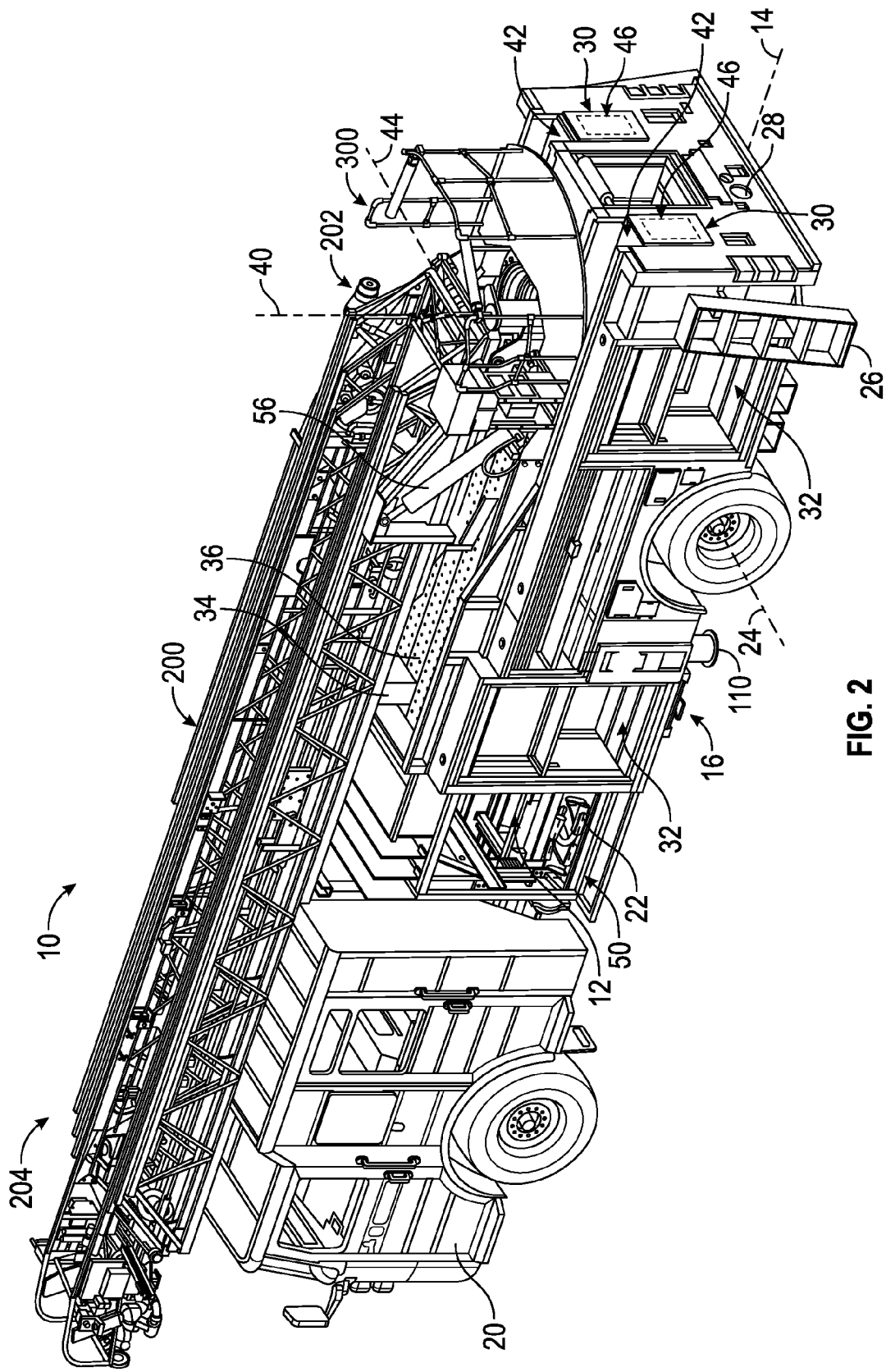
FIG. 2 is a rear perspective view of the fire apparatus of FIG. 1, according to an exemplary embodiment.
Figure 8:
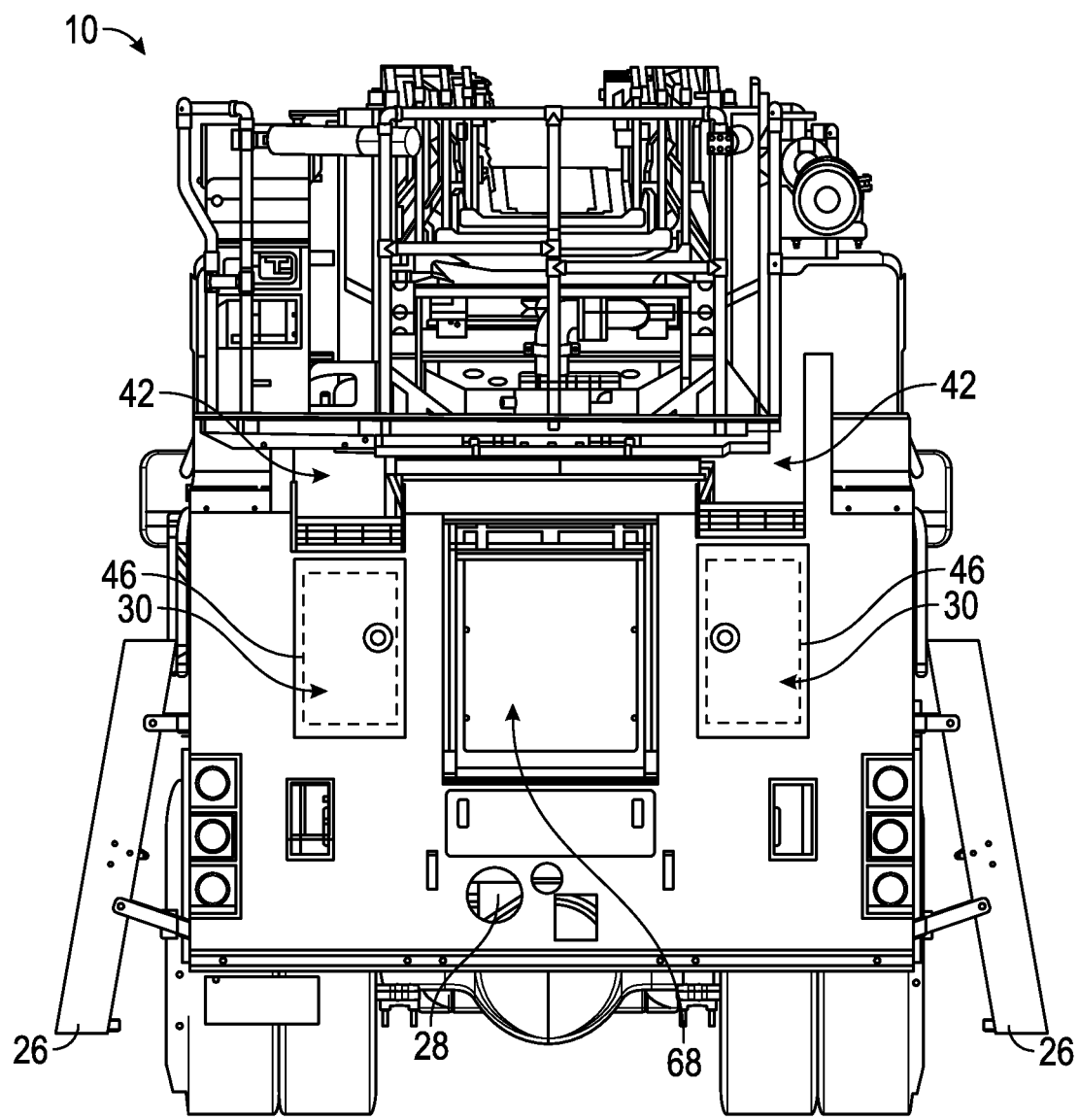
FIG. 8 is a rear view of the fire apparatus of FIG. 1, according to an exemplary embodiment.
Figure 9:
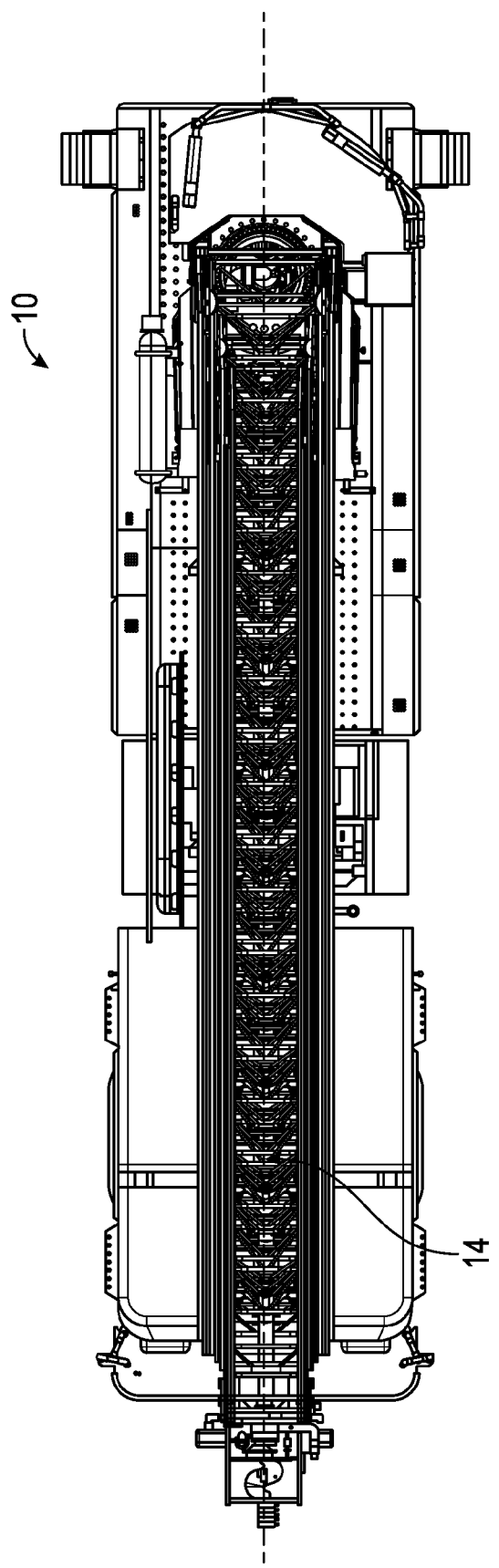
FIG. 9 is a top view of the fire apparatus of FIG. 1, according to an exemplary embodiment.

As shown in FIGS. 2 and 8, the fire apparatus 10 also includes ground ladders 46. The ground ladders 46 are stored within compartments that are closed with doors 30. As shown in FIGS. 2 and 8, the fire apparatus 10 includes two storage compartments and doors 30, each to store one or more individual ground ladders 46. In other embodiments, only one storage compartment and door 30 is included to store one or more ground ladders 46. In still other embodiments, three or more storage compartments and doors 30 are included to store three or more ground ladders 46. As shown in FIGS. 2 and 8, a hose chute 42 is provided on each lateral side at the rear of the fire apparatus 10. The hose chutes 42 define a passageway where one or more hoses may be disposed once pulled from a hose storage location, shown as hose storage platform 36. The fire apparatus 10 includes additional storage, shown as storage compartments 32 and 68, to store miscellaneous items and gear used by emergency response personnel (e.g., helmets, axes, oxygen tanks, medical kits, etc.).

Figure 7:
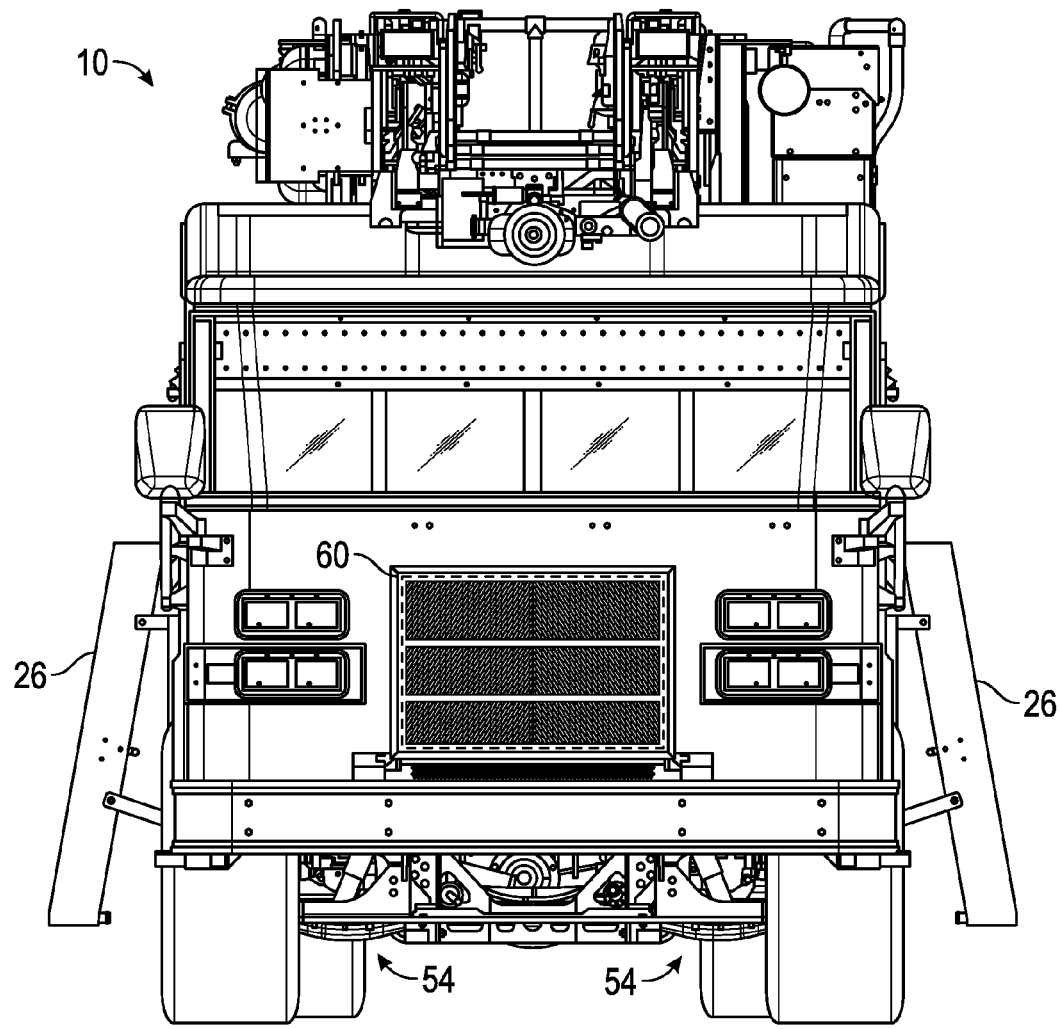
FIG. 7 is a front view of the fire apparatus of FIG. 1, according to an exemplary embodiment.

As shown in FIGS. 1 and 7, the fire apparatus 10 includes an engine 60. In one embodiment, the engine 60 is coupled to the frame 12. According to an exemplary embodiment, the engine 60 receives fuel (e.g., gasoline, diesel, etc.) from a fuel tank and combusts the fuel to generate mechanical energy. A transmission receives the mechanical energy and provides an output to a drive shaft. The rotating drive shaft is received by a differential, which conveys the rotational energy of the drive shaft to a final drive (e.g., wheels, etc.). The final drive then propels or moves the fire apparatus 10. According to an exemplary embodiment, the engine 60 is a compression-ignition internal combustion engine that utilizes diesel fuel. In alternative embodiments, the engine 60 is another type of device (e.g., spark-ignition engine, fuel cell, electric motor, etc.) that is otherwise powered (e.g., with gasoline, compressed natural gas, hydrogen, electricity, etc.).

As shown in FIGS. 1-2, the fire apparatus 10 is a quint configuration fire truck that includes a ladder assembly, shown as aerial ladder assembly 200, and a turntable assembly, shown as turntable 300. The aerial ladder assembly 200 includes a first end 202 (e.g., base end, proximal end, pivot end, etc.) and a second end 204 (e.g., free end, distal end, platform end, implement end, etc.). As shown in FIGS. 1-2, the aerial ladder assembly 200 includes a plurality of ladder sections. In some embodiments, the plurality of sections of the aerial ladder assembly 200 is extendable. An actuator may selectively reconfigure the aerial ladder assembly 200 between an extended configuration and a retracted configuration. By way of example, aerial ladder assembly 200 may include a plurality of nesting sections that telescope with respect to one another. In the extended configuration (e.g., deployed position, use position, etc.), the aerial ladder assembly 200 is lengthened, and the second end 204 is extended away from the first end 202. In the retracted configuration (e.g., storage position, transport position, etc.), the aerial ladder assembly 200 is shortened, and the second end 204 is withdrawn towards the first end 202.

According to an exemplary embodiment, the first end 202 of the aerial ladder assembly 200 is coupled to the frame 12.

By way of example, aerial ladder assembly 200 may be directly coupled to frame 12 or indirectly coupled to frame 12 (e.g., with an intermediate superstructure, etc.). As shown in FIGS. 1-2, the first end 202 of the aerial ladder assembly 200 is coupled to the turntable 300. The turntable 300 may be directly or indirectly coupled to the frame 12 (e.g., with an intermediate superstructure, via rear section 16, etc.). As shown in FIG. 1, the turntable 300 includes a railing assembly, shown as hand rails 302, and guard rails, shown as guard rails 304. The hand rails 302 provide support for operators aboard the turntable 300. The guard rails 304 are coupled to the hand rails 302 and provide two entrances to the turntable 300. An operator may provide a force to rotate the guard rails 304 open and gain access to the turntable 300. In the embodiment shown in FIG. 2, the turntable 300 rotates relative to the frame 12 about a generally vertical axis 40. According to an exemplary embodiment, the turntable 300 is rotatable a full 360 degrees relative to the frame 12. In other embodiments, the rotation of the turntable 300 relative to the frame 12 is limited to a range of less than 360 degrees, or the turntable 300 is fixed relative to the frame 12. As shown in FIGS. 1-4, the rear section 16 includes a pair of ladders 26 positioned on opposing lateral sides of the fire apparatus 10. As shown in FIGS. 1-2, the ladders 26 are coupled to the rear section 16 with hinges. An operator (e.g., a fire fighter, etc.) may access the turntable 300 by climbing either one of the ladders 26 and entering through the guard rails 304. According to the exemplary embodiment shown in FIGS. 1-2, the turntable 300 is positioned at the rear end of the rear section 16 (e.g., rear mount, etc.). In other embodiments, the turntable 300 is positioned at the front end of the rear section 16, proximate the front cabin 20 (e.g., mid mount, etc.). In still other embodiments, the turntable 300 is disposed along front cabin 20 (e.g., front mount, etc.).

According to the exemplary embodiment shown in FIGS. 1-2, the first end 202 of the aerial ladder assembly 200 is pivotally coupled to the turntable 300. An actuator, shown as cylinder 56, is positioned to rotate the aerial ladder assembly 200 about a horizontal axis 44. The actuator may be a linear actuator, a rotary actuator, or still another type of device and may be powered hydraulically, electrically, or still otherwise powered. In one embodiment, aerial ladder assembly 200 is rotatable between a lowered position (e.g., the position shown in FIG. 1, etc.) and a raised position. The aerial ladder assembly 200 may be generally horizontal or an angle (e.g., 10 degrees, etc.) below the horizontal when disposed in the lowered position (e.g., a stored position, etc.). In one embodiment, extension and retraction of cylinders 56 rotates aerial ladder assembly 200 about the horizontal axis 44 and raises or lowers, respectively, the second end 204 of aerial ladder assembly 200. In the raised position, the aerial ladder assembly 200 allows access between the ground and an elevated height for a fire fighter or a person being aided by the fire fighter.

Figure 5:
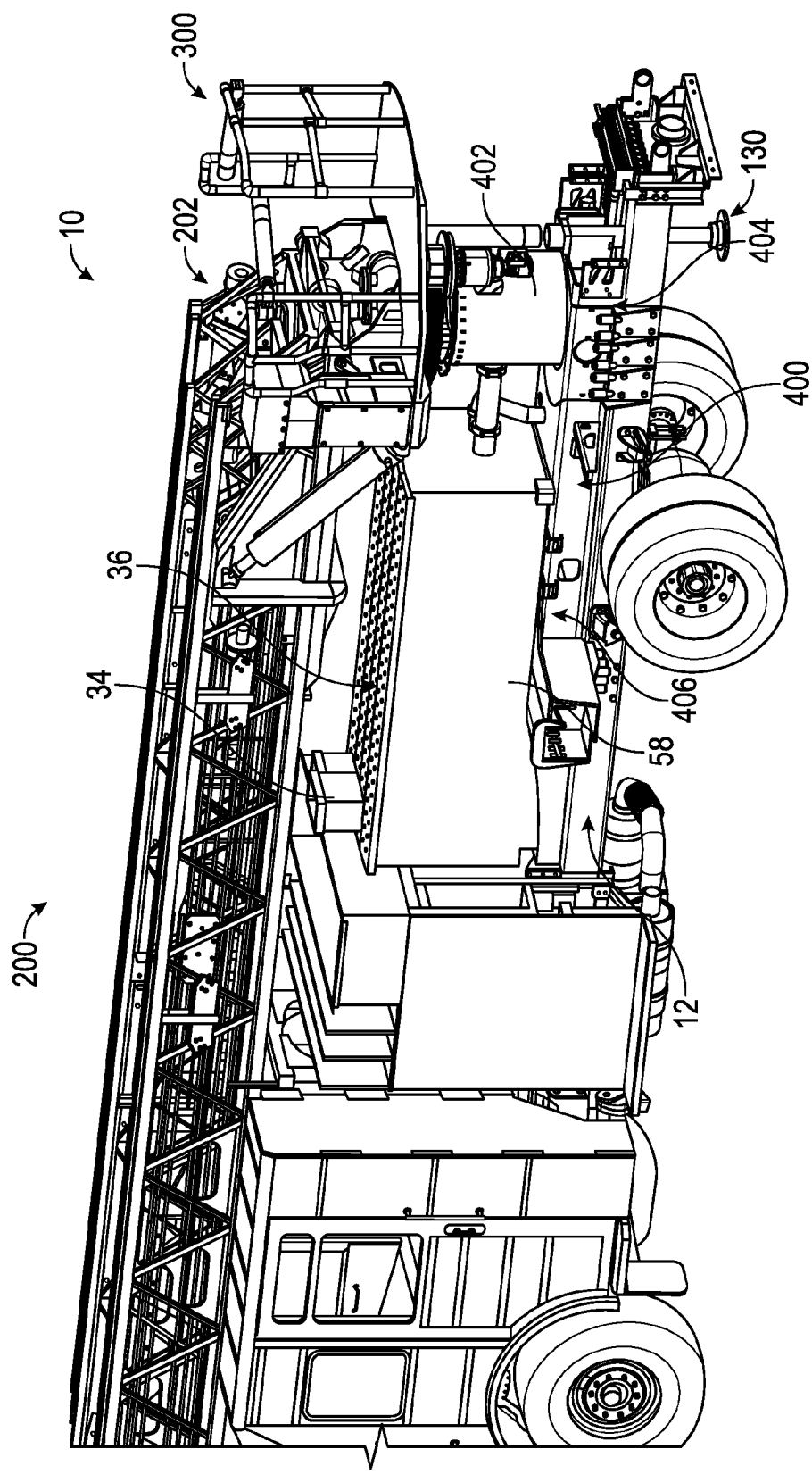
FIG. 5 is a rear perspective view of a water tank of the fire apparatus of FIG. 1, according to an exemplary embodiment.

According to the exemplary embodiment shown in FIG. 5, a reservoir, shown as water tank 58, is coupled to the frame 12 with a superstructure. In one embodiment, the water tank 58 is located within the rear section 16 and below the hose storage platform 36. As shown in FIG. 5, the water tank 58 is coupled to the frame 12 with a tubular component, shown as torque box 400. In one embodiment, the water tank 58 stores at least 500 gallons of water. In other embodiments, the reservoir stores another firefighting agent (e.g., foam, etc.). According to the exemplary embodiment shown in FIGS. 2 and 5, the water tank 58 is filled with a fill dome, shown as fill dome 34.

As shown in FIGS. 1-2, the fire apparatus 10 includes a pump house, shown as pump house 50. A pump 22 may be disposed within the pump house 50. By way of example, the pump house 50 may include a pump panel having an inlet for the entrance of water from an external source (e.g., a fire hydrant, etc.). As shown in FIG. 2, an auxiliary inlet, shown as inlet 28, is provided at the rear of the fire apparatus 10. The pump house 50 may include an outlet configured to engage a hose. The pump 22 may pump fluid through the hose to extinguish a fire (e.g., water from the inlet of the pump house 50, water from the inlet 28, water stored in the water tank 58, etc.).

Referring still to the exemplary embodiment shown in FIGS. 1-2, an implement, shown as nozzle 38 (e.g., deluge gun, water cannon, deck gun, etc.), is disposed at the second end 204 of the aerial ladder assembly 200. The nozzle 38 is connected to a water source (e.g., the water tank 58, an external source, etc.) via an intermediate conduit extending along the aerial ladder assembly 200 (e.g., along the side of the aerial ladder assembly 200, beneath the aerial ladder assembly 200, in a channel provided in the aerial ladder assembly 200, etc.). By pivoting the aerial ladder assembly 200 into the raised position, the nozzle 38 may be elevated to expel water from a higher elevation to facilitate suppressing a fire. In some embodiments, the second end 204 of the aerial ladder assembly 200 includes a basket. The basket may be configured to hold at least one of fire fighters and persons being aided by the fire fighters. The basket provides a platform from which a fire fighter may complete various tasks (e.g., operate the nozzle 38, create ventilation, overhaul a burned area, perform a rescue operation, etc.).

Figure 3:
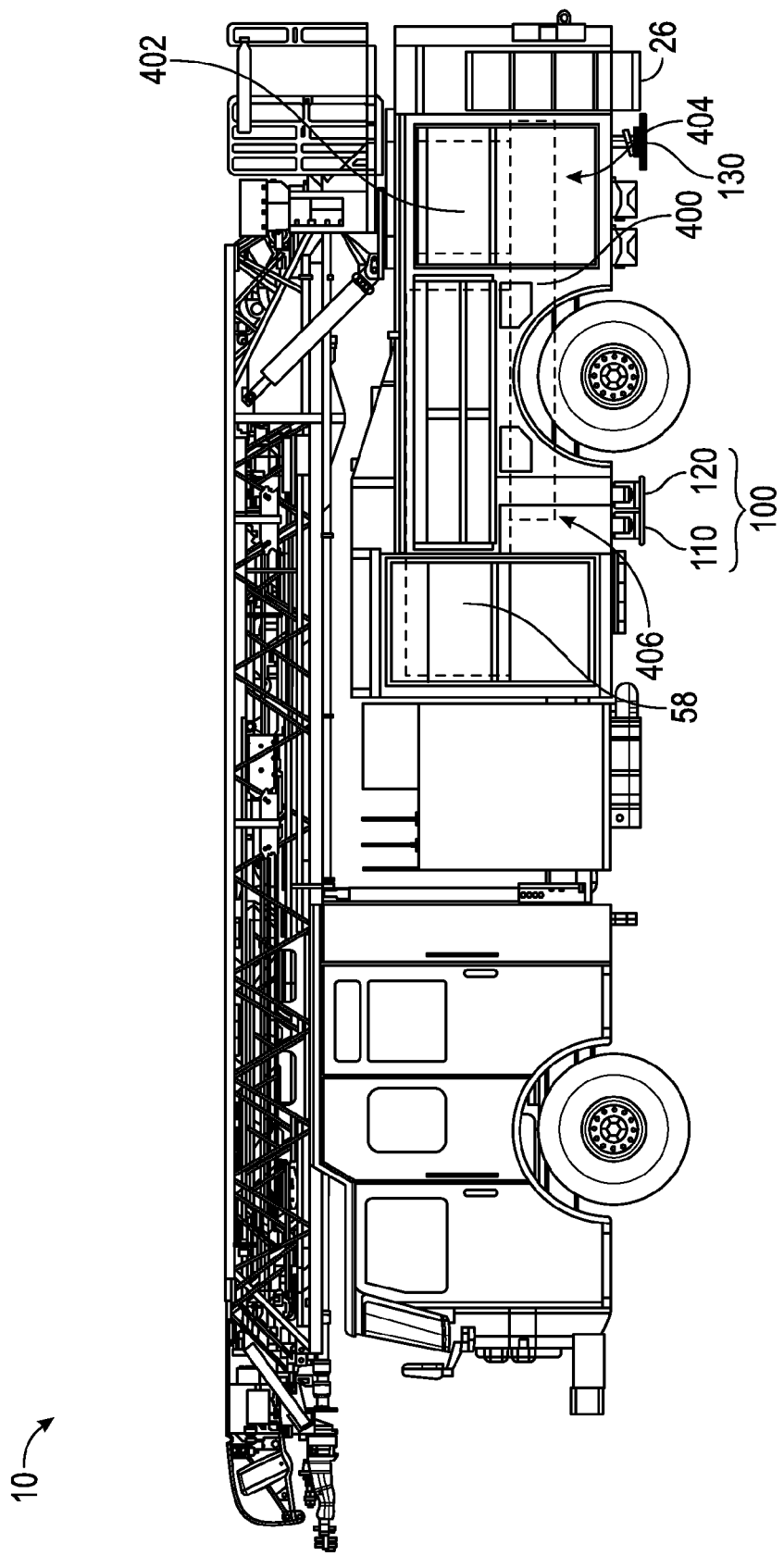
FIG. 3 is a left side view of the fire apparatus of FIG. 1, according to an exemplary embodiment.
Figure 4:
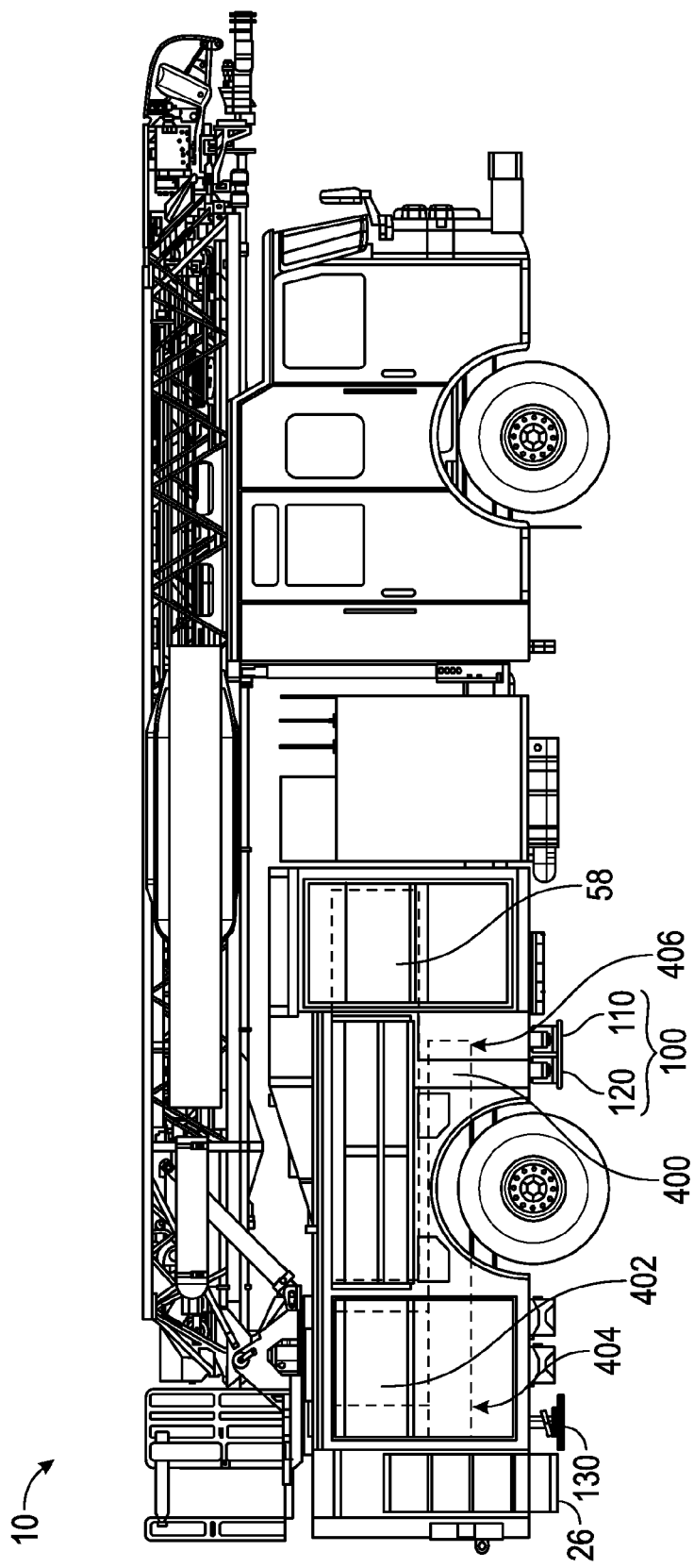
FIG. 4 is a right side view of the fire apparatus of FIG. 1, according to an exemplary embodiment.
Figure 6:
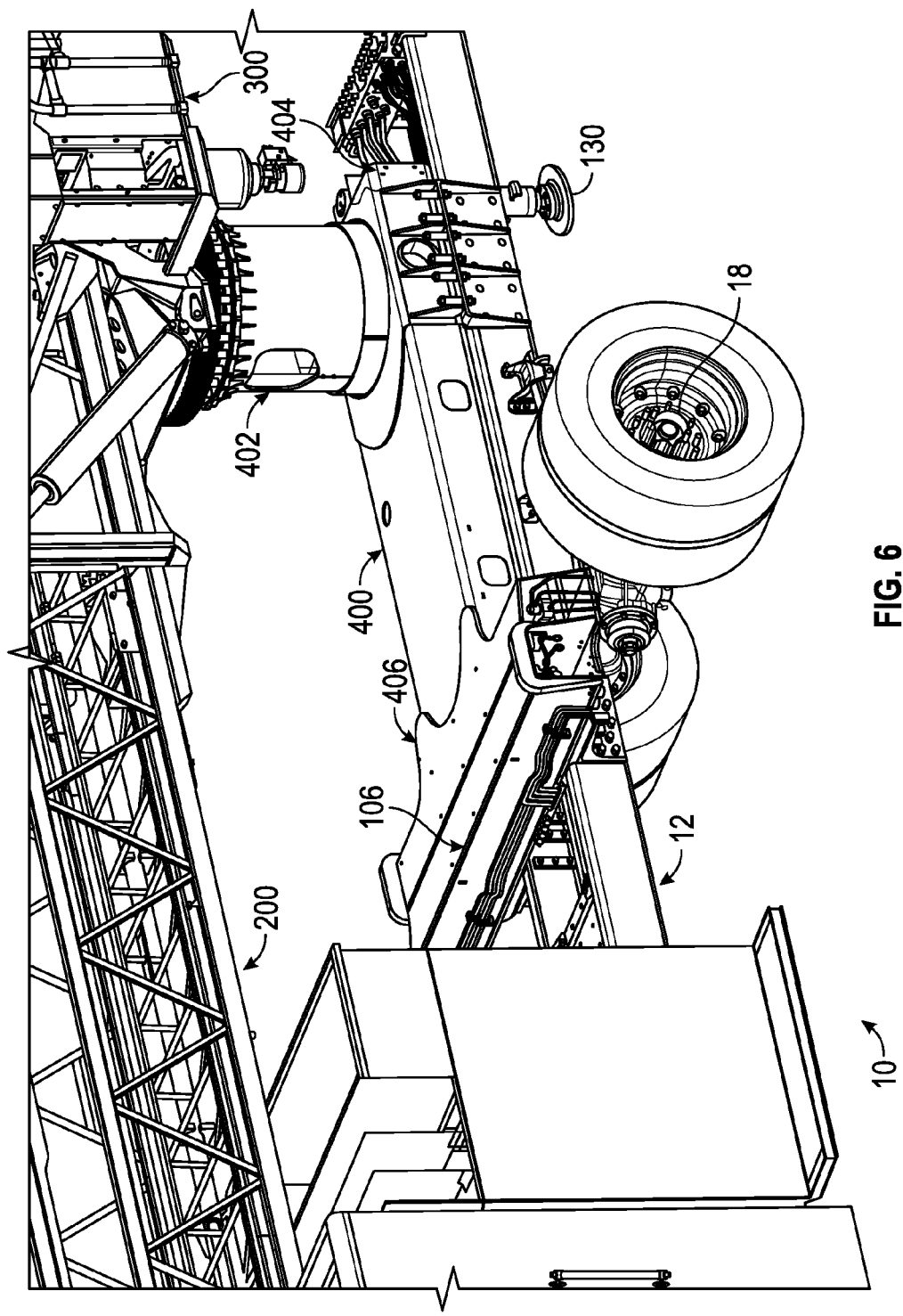
FIG. 6 is a front perspective view of various internal components of the fire apparatus of FIG. 1, according to an exemplary embodiment.

According to the exemplary embodiment shown in FIGS. 5-6, the torque box 400 is coupled to the frame 12. In one embodiment, the torque box 400 extends the full width between the lateral outsides of the first frame rail 11 and the second frame rail 13 of the frame 12. The torque box 400 includes a body portion having a first end 404 and a second end 406. As shown in FIG. 5, a pedestal, shown as pedestal 402, is attached to the first end 404 of the torque box 400. In one embodiment, the pedestal 402 is disposed rearward of (i.e., behind, etc.) the single rear axle 18. The pedestal 402 couples the turntable 300 to the torque box 400. The turntable 300 rotatably couples the first end 202 of the aerial ladder assembly 200 to the pedestal 402 such that the aerial ladder assembly 200 is selectively repositionable into a plurality of operating orientations. According to the exemplary embodiment shown in FIGS. 3-4, a single set of outriggers, shown as outriggers 100, includes a first outrigger 110 and a second outrigger 120. As shown in FIGS. 3-4, the first outrigger 110 and the second outrigger 120 are attached to the second end 406 of the torque box 400 in front of the single rear axle 18 and disposed on opposing lateral sides of the fire apparatus 10. As shown in FIGS. 1-4, the outriggers 100 are moveably coupled to the torque box 400 and may extend outward, away from the longitudinal axis 14, and parallel to a lateral axis 24. According to an exemplary embodiment, the outriggers 100 extend to a distance of eighteen feet (e.g., measured between the center of a pad of the first outrigger 110 and the center of a pad of the second outrigger 120, etc.). In other embodiments, the outriggers 100 extend to a distance of less than or greater than eighteen feet. An actuator may be positioned to extend portions of each of the first outrigger 110 and the second outrigger 120 towards the ground. The actuator may be a linear actuator, a rotary actuator, or still another type of device and may be powered hydraulically, electrically, or still otherwise powered.

According to the exemplary embodiment shown in FIGS. 3-5, a stability foot, shown as stability foot 130, is attached to the first end 404 of the torque box 400. An actuator (e.g., a linear actuator, a rotary actuator, etc.) may be positioned to extend a portion of the stability foot 130 towards the ground. Both the outriggers 100 and the stability foot 130 are used to support the fire apparatus 10 (e.g., while stationary and in use to fight fires, etc.). According to an exemplary embodiment, with the outriggers 100 and stability foot 130 extended, the fire apparatus 10 can withstand a tip capacity of at least 750 pounds applied to the last rung on the second end 204 of the aerial ladder assembly 200 while fully extended (e.g., to provide a horizontal reach of at least 90 feet, to provide a horizontal reach of at least 100 feet, to provide a vertical extension height of at least 95 feet, to provide a vertical extension height of at least 105 feet, to provide a vertical extension height of at least 107 feet, etc.). The outriggers 100 and the stability foot 130 are positioned to transfer the loading from the aerial ladder assembly 200 to the ground. For example, a load applied to the aerial ladder assembly 200 (e.g., a fire fighter at the second end 204, a wind load, etc.) may be conveyed into to the turntable 300, through the pedestal 402 and the torque box 400, and into the ground through at least one of the outriggers 100 and the stability foot 130. While the fire apparatus 10 is being driven or not in use, the actuators of the first outrigger 110, the second outrigger 120, and the stability foot 130 may retract portions of the outriggers 100 and the stability foot 130 into a stored position.

Figure 10:
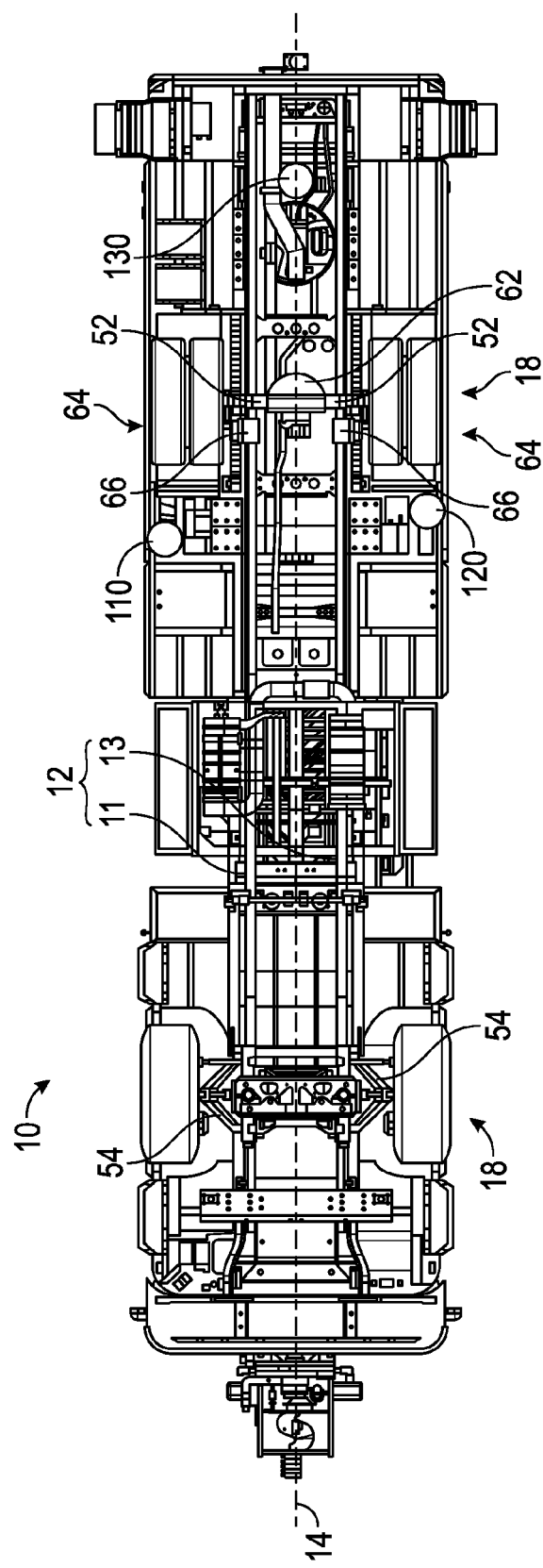
FIG. 10 is a bottom view of the fire apparatus of FIG. 1, according to an exemplary embodiment.
Figure 11:
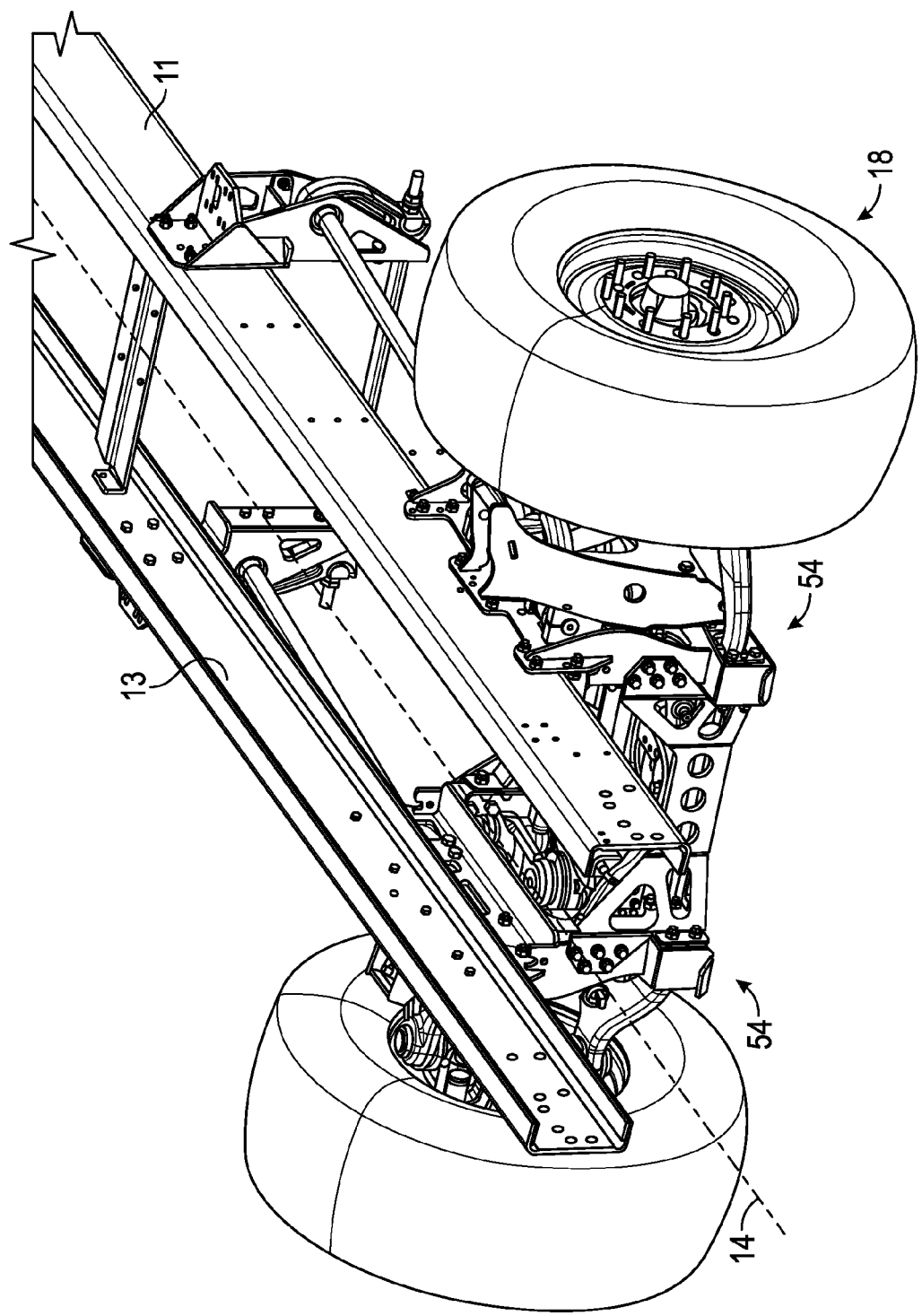
FIG. 11 is a perspective view of a front suspension of the fire apparatus of FIG. 1, according to an exemplary embodiment.
Figure 12:
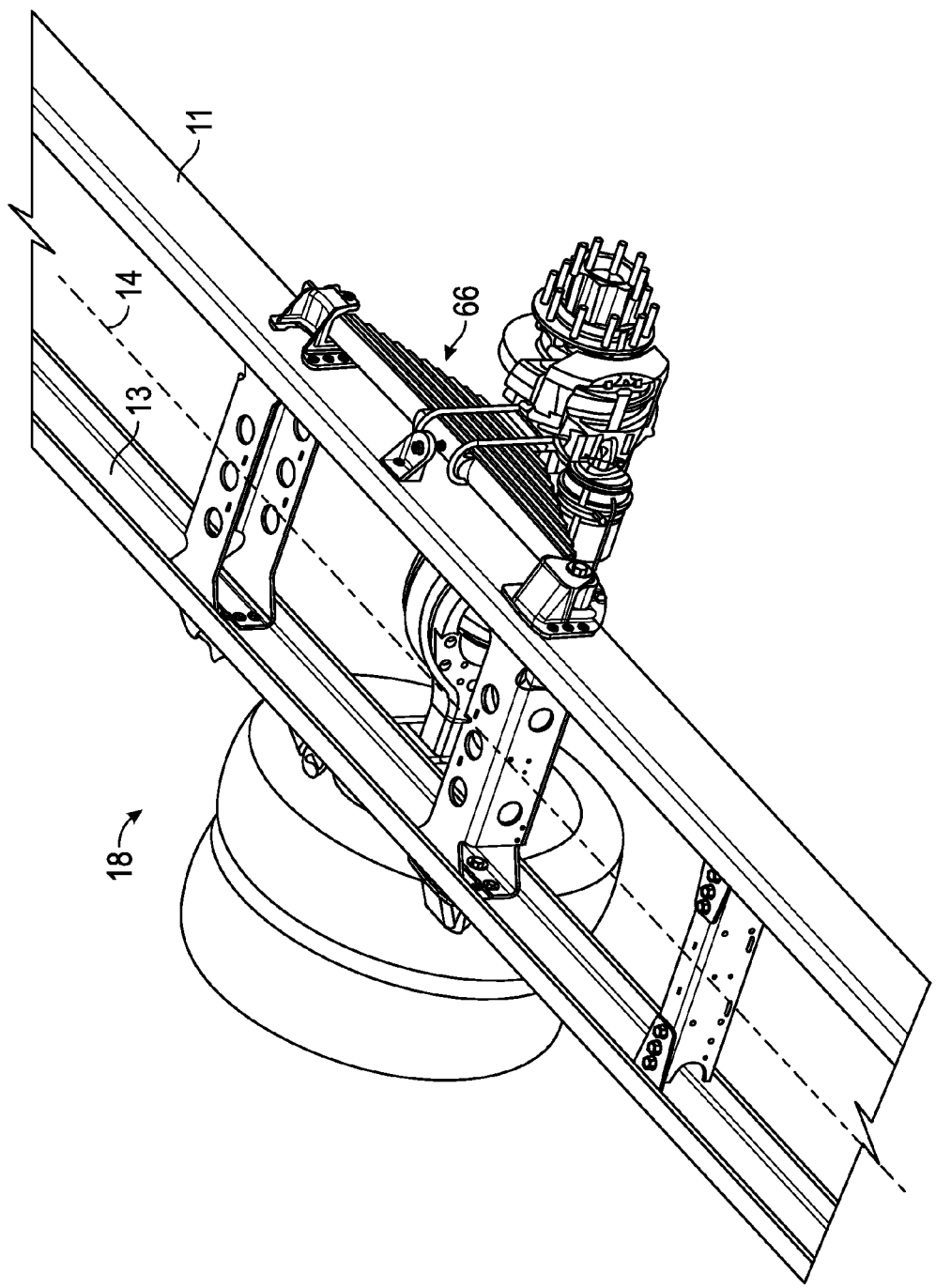
FIG. 12 is a perspective view of a rear suspension of the fire apparatus of FIG. 1, according to an exemplary embodiment.

As shown in FIGS. 10 and 12, the single rear axle 18 includes a differential 62 coupled to a pair of hub assemblies 64 with a pair of axle shaft assemblies 52. As shown in FIGS. 10 and 12, the single rear axle 18 includes a solid axle configuration extending laterally across the frame 12 (e.g., chassis, etc.). A rear suspension, shown as rear suspension 66, includes a pair of leaf spring systems. The rear suspension 66 may couple the single solid axle configuration of the single rear axle 18 to the frame 12. In one embodiment, the single rear axle 18 has a gross axle weight rating of no more than (i.e., less than or equal to, etc.) 33,500 pounds. In other embodiments, a first axle shaft assembly 52 has a first set of constant velocity joints and a second axle shaft assembly 52 has a second set of constant velocity joints. The first axle assembly 52 and the second axle assembly 52 may extend from opposing lateral sides of the differential 62, coupling the differential 62 to the pair of hub assemblies 64. As shown in FIGS. 10-11, a front suspension, shown as front suspension 54, for the front axle 18 includes a pair of independent suspension assemblies. In one embodiment, the front axle 18 has a gross axle weight rating of no more than 33,500 pounds.

According to the exemplary embodiment shown in FIGS. 1-12, the aerial ladder assembly 200 forms a cantilever structure when at least one of raised vertically and extended horizontally. The aerial ladder assembly 200 is supported by the cylinders 56 and by the turntable 300 at the first end 202. The aerial ladder assembly 200 supports static loading from its own weight, the weight of any equipment coupled to the ladder (e.g., the nozzle 38, a water line coupled to the nozzle, a platform, etc.), and the weight of any persons using the ladder. The aerial ladder assembly 200 may also support various dynamic loads (e.g., due to forces imparted by a fire fighter climbing the aerial ladder assembly 200, wind loading, loading due to rotation, elevation, or extension of aerial ladder assembly, etc.). Such static and dynamic loads are carried by the aerial ladder assembly 200. The forces carried by the cylinders 56, the turntable 300, and the frame 12 may be proportional (e.g., directly proportional, etc.) to the length of the aerial ladder assembly 200. At least one of the weight of the aerial ladder assembly 200, the weight of the turntable 300, the weight of the cylinders 56, and the weight of the torque box 400 is traditionally increased to increase at least one of the extension height rating, the horizontal reach rating, the static load rating, and the dynamic load rating. Such vehicles traditionally require the use of a chassis having a tandem rear axle. However, the aerial ladder assembly 200 of the fire apparatus 10 has an increased extension height rating and horizontal reach rating without requiring a chassis having a tandem rear axle (e.g., a tandem axle assembly, etc.). According to the exemplary embodiment shown in FIGS. 1-12, the fire apparatus 10 having a single rear axle 18 is lighter, substantially less difficult to maneuver, and less expensive to manufacture than a fire apparatus having a tandem rear axle.

Figure 13:
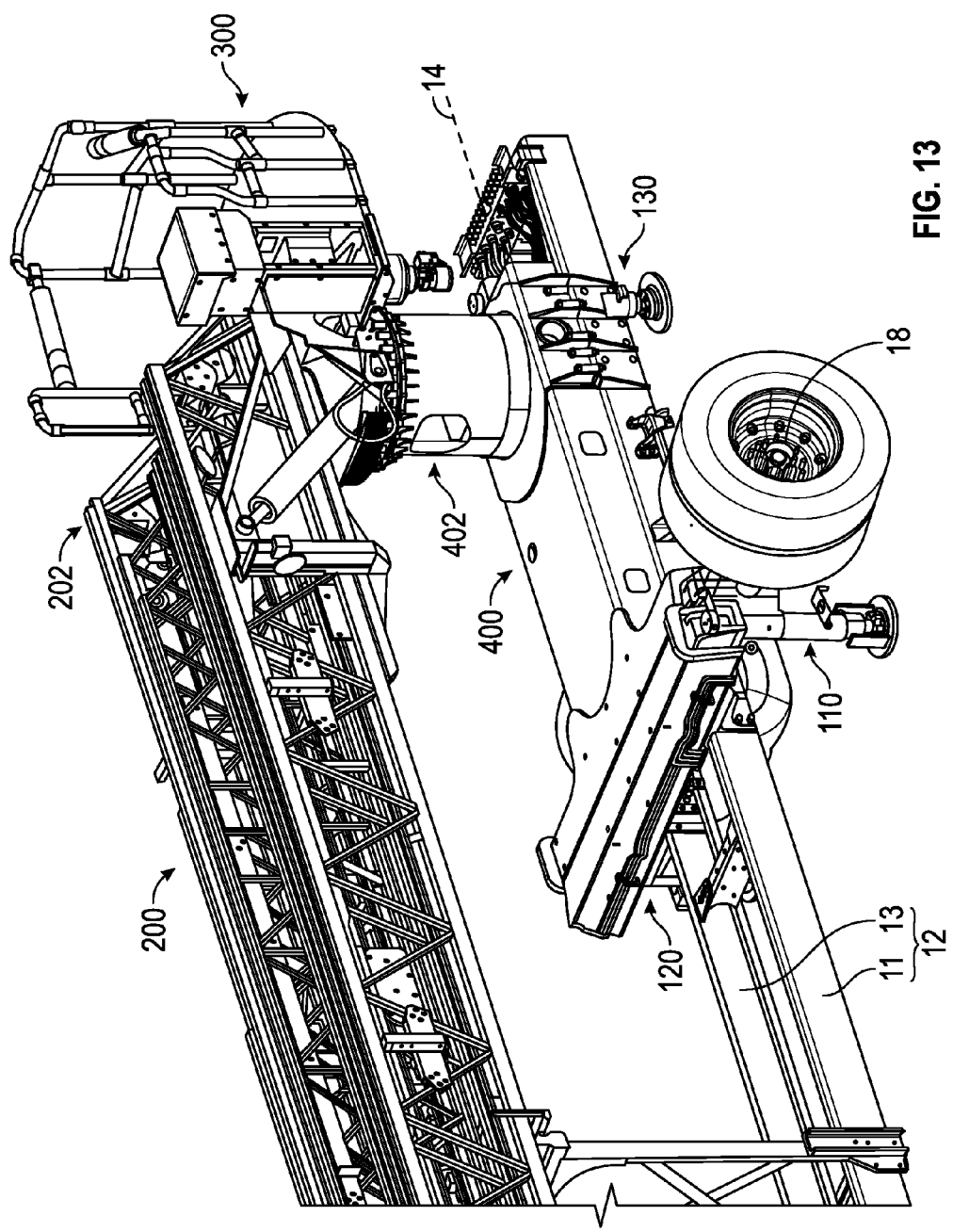
FIG. 13 is a front perspective view of a pedestal, a torque box, a turntable, and an aerial ladder assembly for a fire apparatus, according to an exemplary embodiment.

According to the exemplary embodiment shown in FIG. 13, the torque box 400 and the pedestal 402 include various components that facilitate transferring the loading from the aerial ladder assembly 200 to the frame 12 of the fire apparatus 10. As shown in FIG. 13, a front perspective view of the torque box 400 and the pedestal 402 is shown, according to an exemplary embodiment. According to an exemplary embodiment, the aerial ladder assembly 200 and the turntable 300 are rotatably coupled to the pedestal 402. By way of example, a connection between the turntable 300 and the pedestal 402 may include a slewing bearing (e.g., a rotational rolling-element bearing with an outer gear and an inner bearing element that supports a platform, etc.) to support the turntable 300. A drive member (e.g., a motor, etc.) may drive (e.g., rotate, etc.) the turntable 300. The motor may be mechanically coupled to the outer gear of the slewing bearing via a drive pinion. In other embodiments, the turntable 300 is fixed to the pedestal 402 (i.e., cannot rotate, etc.).

Figure 14:
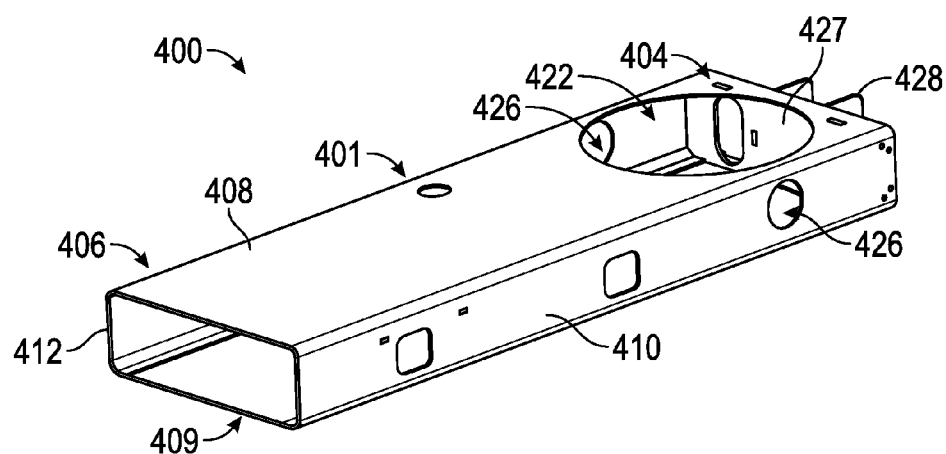
FIG. 14 is a perspective view of the torque box of FIG. 13, according to an exemplary embodiment.
Figure 15:
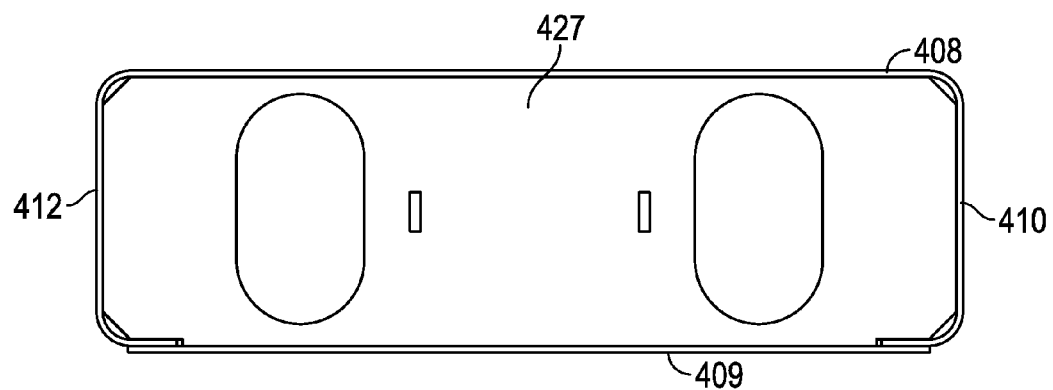
FIG. 15 is a cross-sectional view of the torque box of FIG. 14, according to an exemplary embodiment.
Figure 16:
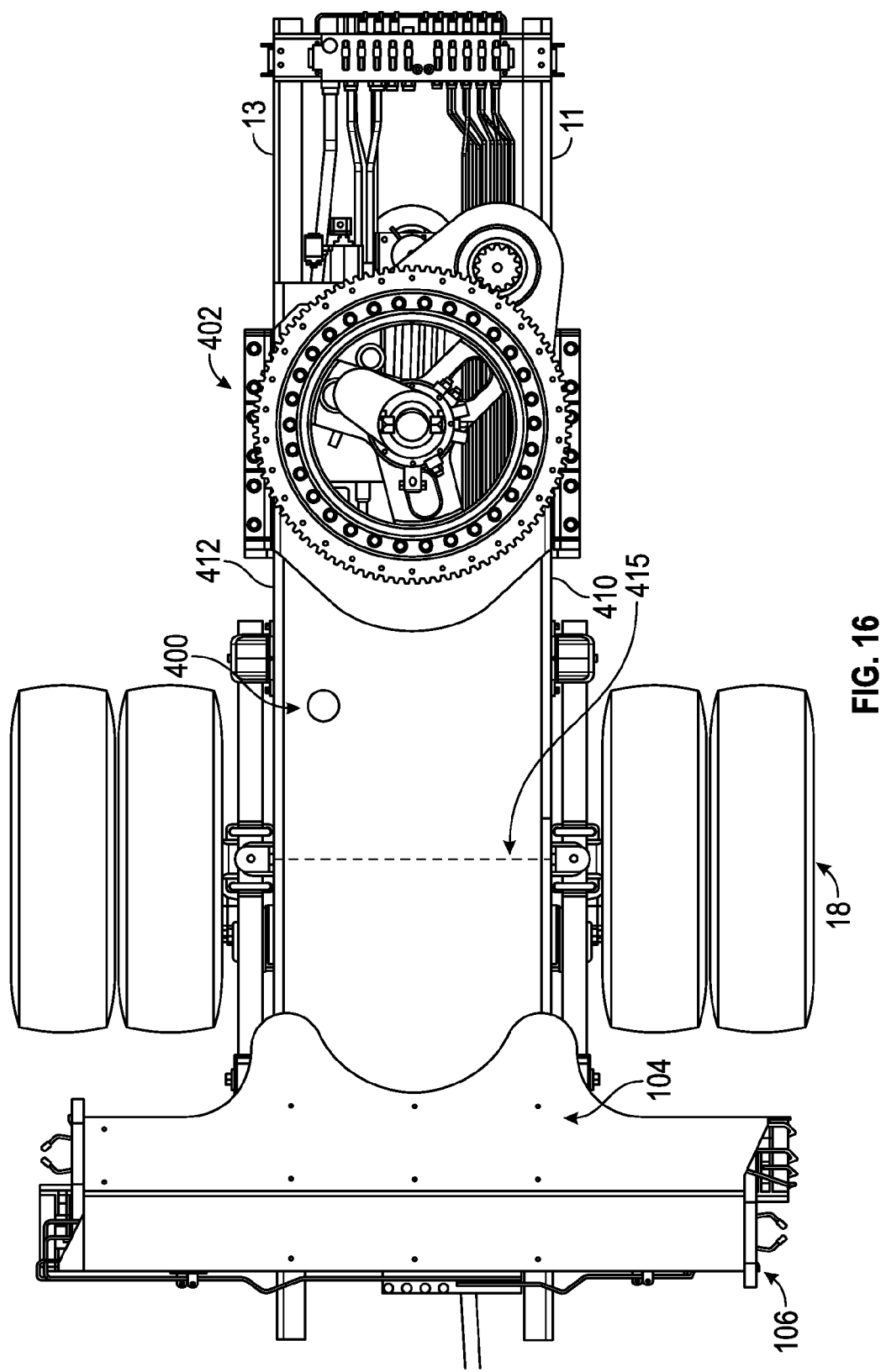
FIG. 16 is a top view of the pedestal and the torque box of FIG. 13, according to an exemplary embodiment.

Referring next to the exemplary embodiment shown in FIGS. 14-22, the torque box 400 is coupled to the pedestal 402. As shown in FIGS. 14-15, the torque box 400 includes a body portion, shown as tubular component 401. In one embodiment, the tubular component 401 has a substantially rectangular cross-sectional shape. The tubular component 401 includes a top surface 408, a bottom surface 409, a first side wall 410, and a second side wall 412. In other embodiments, the tubular component 401 may have a different cross-sectional shape (e.g., square, octagonal, irregular polygon, C-shape, hexagonal, etc.). According to the exemplary embodiment shown in FIG. 16, the torque box 400 has a width 415 (e.g., lateral distance, etc.) that is equal to the spacing between the laterally-outward facing surfaces of the first frame rail 11 and the second frame rail 13 of the frame 12. In one embodiment, the first side wall 410 of the torque box 400 is flush with the laterally-outward facing surface of the first frame rail 11 and the second side wall 412 of the torque box 400 is flush with the laterally-outward facing surface of the second frame rail 13. In other embodiments, the width of the toque box 400 is not the same as the spacing between the laterally-outward facing surfaces of the first frame rail 11 and the second frame rail 13. For example, the width may be equal to the distance from the center of the first frame rail 11 to the center of the second frame rail 13 or greater than the spacing between the first frame rail 11 and the second frame rail 13 of the frame 12. Referring again to FIGS. 14-15, the tubular component 401 includes the first end 404 and the second end 406. The torque box 400 defines an aperture 422 in the top surface 408 that is positioned at the first end 404. As shown in FIG. 14, the torque box 400 defines an aperture 426 through both the first side wall 410 and the second side wall 412. The second end 406 of the torque box 400 is open, while the first end 404 includes a cap, shown as plate 427, to which a bracket, shown as bracket 428, is attached.

Figure 17:
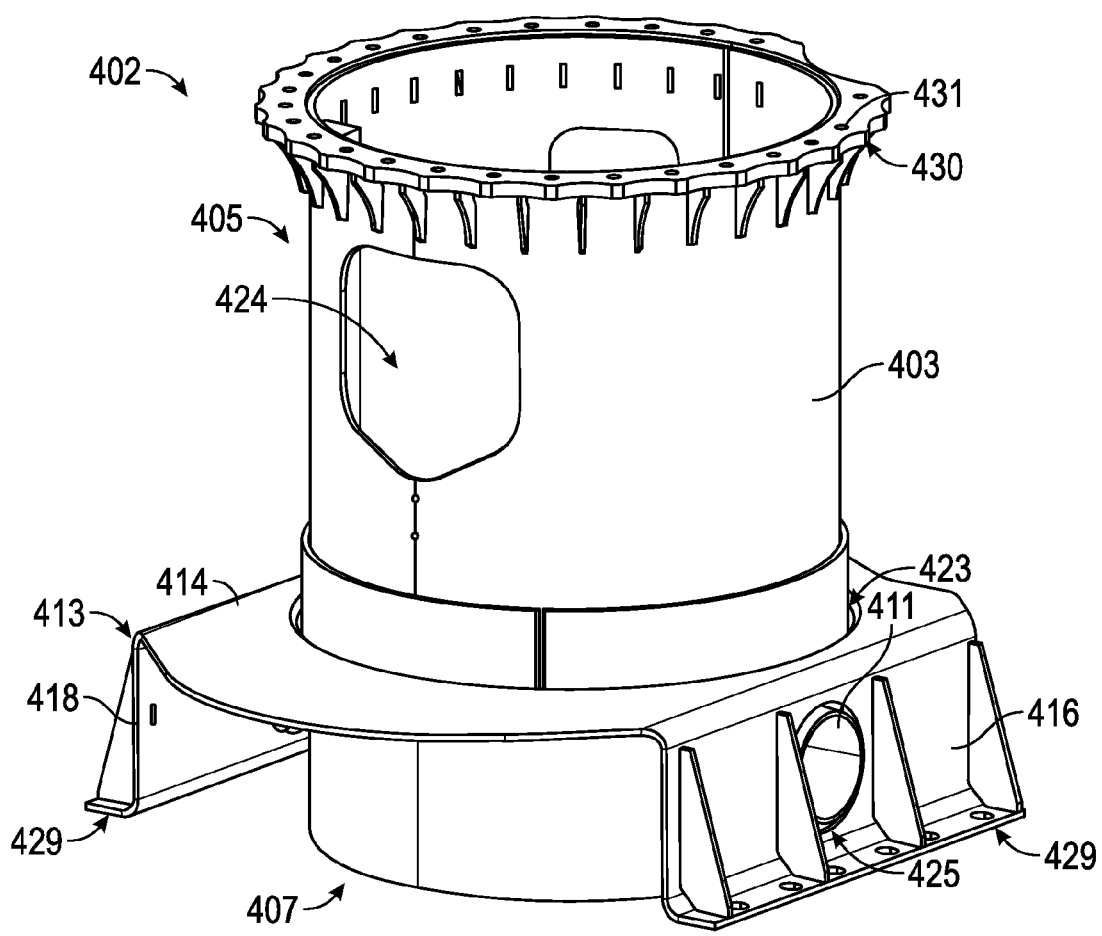
FIG. 17 is a perspective view of the pedestal of FIG. 13, according to an exemplary embodiment.
Figure 18:
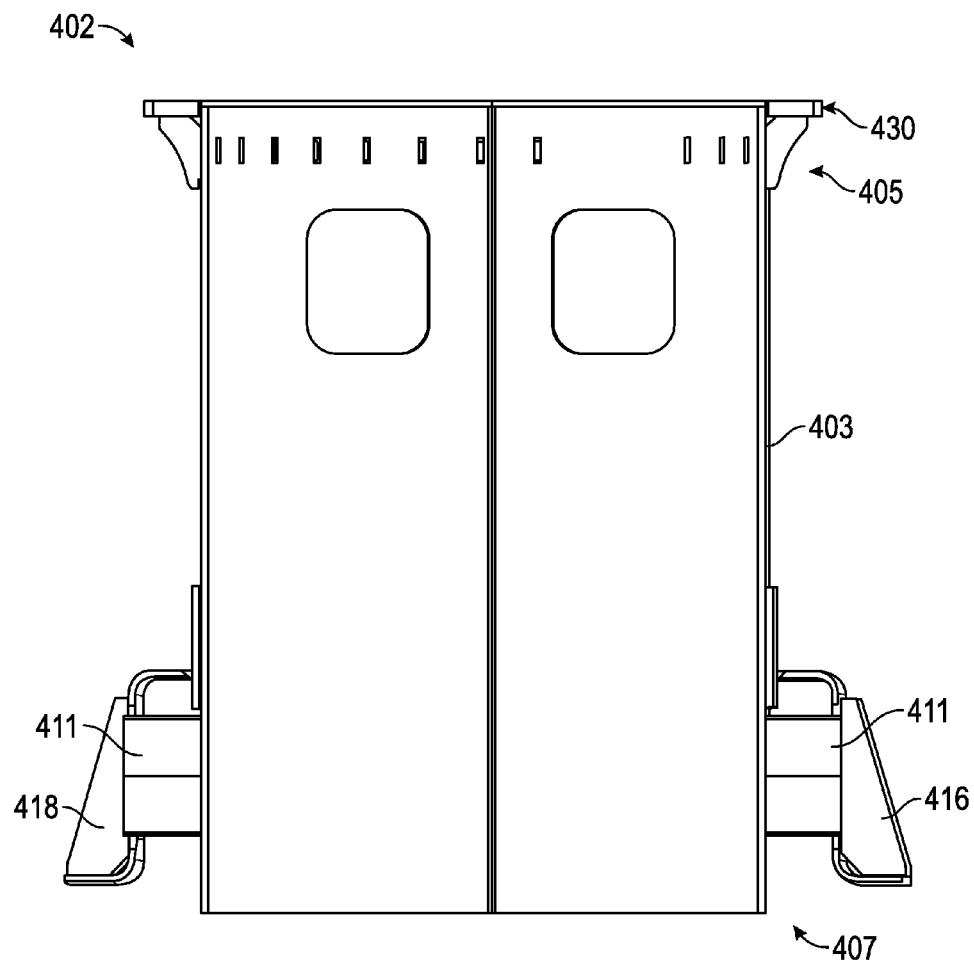
FIG. 18 is a cross-sectional view of the pedestal of FIG. 17, according to an exemplary embodiment.

Referring now to FIG. 17-18, the pedestal 402 includes a body portion, shown as body 403. The body 403 has a substantially cylindrical shape and includes a top end 405 and a bottom end 407. In other embodiments, the body 403 may have another shape (e.g., rectangular, square, hexagonal, etc.). A flange, shown as flange 430, is disposed at the top end 405 of the pedestal 402. As shown in FIG. 17, the flange 430 defines a plurality of holes 431 positioned around the perimeter of pedestal 402. The flange 430 may provide a mounting surface that abuts the connection mechanism (e.g., slewing bearing, etc.) of the pedestal 402 and the turntable 300. The connection mechanism may be fixed to the pedestal 402 with bolts extending through the plurality of holes 431. As shown in FIG. 17, a tube, shown as tube 411, is positioned at the bottom end 407 of the pedestal 402. The pedestal 402 also defines an aperture 424 that faces in a forward direction (e.g., towards the front cabin 20 of the fire apparatus 10, etc.).

Still referring to the exemplary embodiment shown in FIG. 17-18, the pedestal 402 includes a support, shown as plate 413. The plate 413 includes a first wall 414, a first leg 416, and a second leg 418. The first wall 414 defines an aperture 423 that corresponds with the aperture 422 of the torque box 400. As shown in FIG. 17, the aperture 423 receives the bottom end 407 of the pedestal 402. The first leg 416 and the second leg 418 define an aperture 425 that corresponds with the aperture 426 of the torque box 400. A plurality of interfaces 429 are positioned at the end of both the first leg 416 and the second leg 418.

Figure 19:
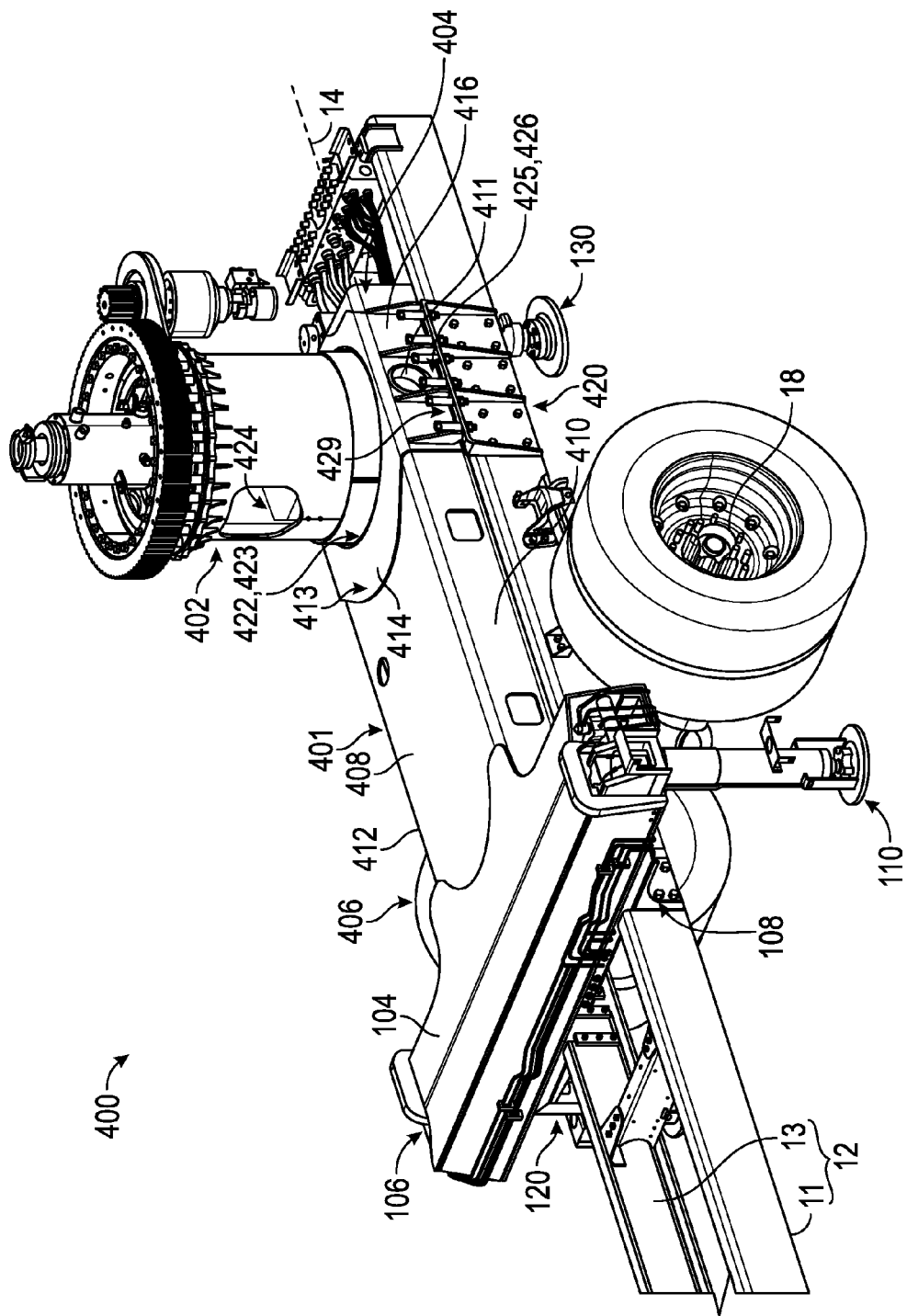
FIG. 19 is a front perspective view of the pedestal and the torque box of FIG. 13, according to an exemplary embodiment.
Figure 20:
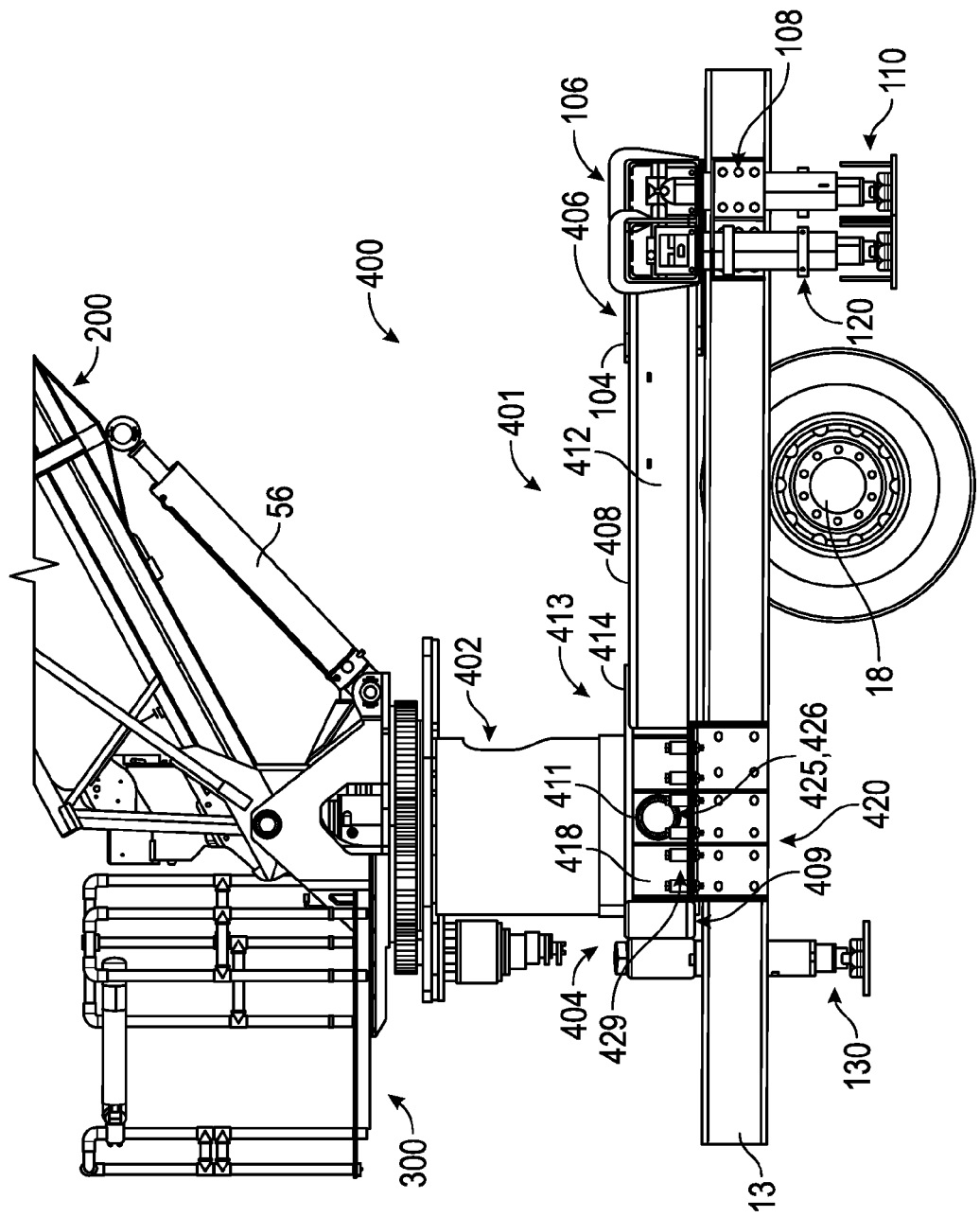
FIG. 20 is a right side view of the pedestal and the torque box of FIG. 13, according to an exemplary embodiment.

As shown in FIGS. 19-20, the first wall 414 of the plate 413 is disposed across the top surface 408 of the tubular component 401. The first leg 416 of the plate 413 is disposed along the first sidewall 410 of the tubular component 401. The second leg 418 of plate 413 is disposed along the second sidewall 412 of the tubular component 401. According to the exemplary embodiment shown in FIGS. 19-21, the plurality of interfaces 429 of the plate 413 are positioned to engage a plurality of brackets 420 that are attached to the frame 12. The plate 413 is configured to secure the first end 404 of the torque box 400 to the frame 12 of the fire apparatus 10. As shown in FIG. 19, the aperture 422 of the tubular component 401 and the aperture 423 of the plate 413 align and receive the pedestal 402. The plate 413 may both secure the torque box 400 to the frame 12 and reinforce the connection area between the torque box 400 and the pedestal 402 (e.g., aperture 422, aperture 423, etc.) while reducing stress concentrations in the tubular component 401.

Still referring to the exemplary embodiment shown in FIGS. 19-20, both the aperture 425 of the plate 413 and the aperture 426 of the torque box 400 align when assembled. The aperture 425 and the aperture 426 are positioned to accept the tube 411 of the pedestal 402. The tube 411 may provide a passageway into the center of the pedestal 402 for hydraulic lines, electrical lines, and other components (e.g., components associated with the aerial ladder assembly 200, etc.). As shown in FIG. 19, the aperture 424 of the pedestal 402 provides an entrance for additional hydraulic lines, electrical lines, water lines, and other components in order to access and operate the various mechanisms of the aerial ladder assembly 200 and the turntable 300.

According to the exemplary embodiment shown in FIGS. 19-20, the bottom surface 409 of the torque box 400 is stacked atop the frame 12. According to an alternative embodiment, torque box 400 forms a portion of the chassis (e.g., suspension or other components may be directly mounted to torque box 400, which forms an integral member of the chassis rather than being stacked atop frame 12, etc.). The tubular component 401 of the torque box 400 extends along the longitudinal axis 14 and spans the single rear axle 18 to transfer loading along the frame 12. Such loading transfer may convey the loading into stability devices (e.g., outrigger, stability feet, etc.) that are positioned to provide a target stability line. As shown in FIGS. 19-20, the first end 404 of the torque box 400 is disposed rearward of the single rear axle 18, while the second end 406 of the torque box 400 is disposed forward of the single rear axle 18. As shown in FIG. 20, the height of the torque box 400 is substantially less than the distance between the frame 12 and the turntable 300. The length (e.g., longitudinal length, etc.) and height (e.g., vertical height, etc.) of the torque box 400 are independent of the size (e.g., length, width, height, etc.) of the ground ladders 46. The length and height of the torque box 400 are reduced such that the torque box 400 has a reduced overall weight. The reduced height of the torque box 400 may facilitate storage aboard the fire apparatus 10 (e.g., for ground ladders, for a reservoir, etc.). The length (e.g., longitudinal distance, etc.) of the torque box 400 may be shorter that those of other vehicles. The pedestal 402 is coupled to the torque box 400 rearward of the single rear axle 18 near the first end 404 of the torque box 400 and spans the gap between the top surface 408 of the torque box 400 and the turntable 300. The pedestal 402 may serve as an intermediate superstructure between the turntable 300 and the torque box 400. In other embodiments, the height of the torque box 400 is equal to the combined height of the torque box 400 and the pedestal 402 shown in the exemplary embodiment of FIG. 20. The pedestal 402 may be omitted, and the turntable 300 may be rotatably coupled directly to the torque box 400.

Referring still to the exemplary embodiment shown in FIGS. 19-20, a housing, shown as outrigger housing 106, abuts the second end 406 of the torque box 400. The outrigger housing 106 is configured to store the set of outriggers 100, which includes the first outrigger 110 and the second outrigger 120. As shown in FIGS. 19-20, the outrigger housing 106 is coupled to both the first frame rail 11 and the second frame rail 13 of the frame 12 with brackets, shown as housing brackets 108. The set of outriggers 100 are moveable between a fully extended position and a retracted position (e.g., via linear actuators, rotary actuators, etc.). During extension, the outriggers 100 protrude from opposing lateral sides of the frame 12. The outrigger housing 106 includes a support, shown as plate 104, which is disposed across the top surface 408 of the tubular component 401. The plate 104 is configured to secure the second end 406 of the torque box 400 to the frame 12. According to an exemplary embodiment, the plate 104 is welded to the tubular component 401. In other embodiments, the connection between the two components may be made using fasteners (e.g., bolts, etc.). The plate 104 is shaped to distribute the stresses due to the loading from the aerial ladder assembly 200.

By way of example, a first load path is defined when the outriggers 100 are in an extended position and engaged with a ground surface (e.g., street, sidewalk, etc.). For example, when a fire fighter is climbing the extended aerial ladder assembly 200, his/her weight creates a force towards the ground which causes a moment (e.g., torque, etc.) about the connection between the aerial ladder assembly 200 and the turntable 300. This loading is then transferred from the turntable 300, down through the pedestal 402, and into the torque box 400. The load travels through the tubular component 401 of the torque box 400, along the longitudinal axis 14, and into the ground through the outrigger housing 106 and the set of outriggers 100.

Figure 21:
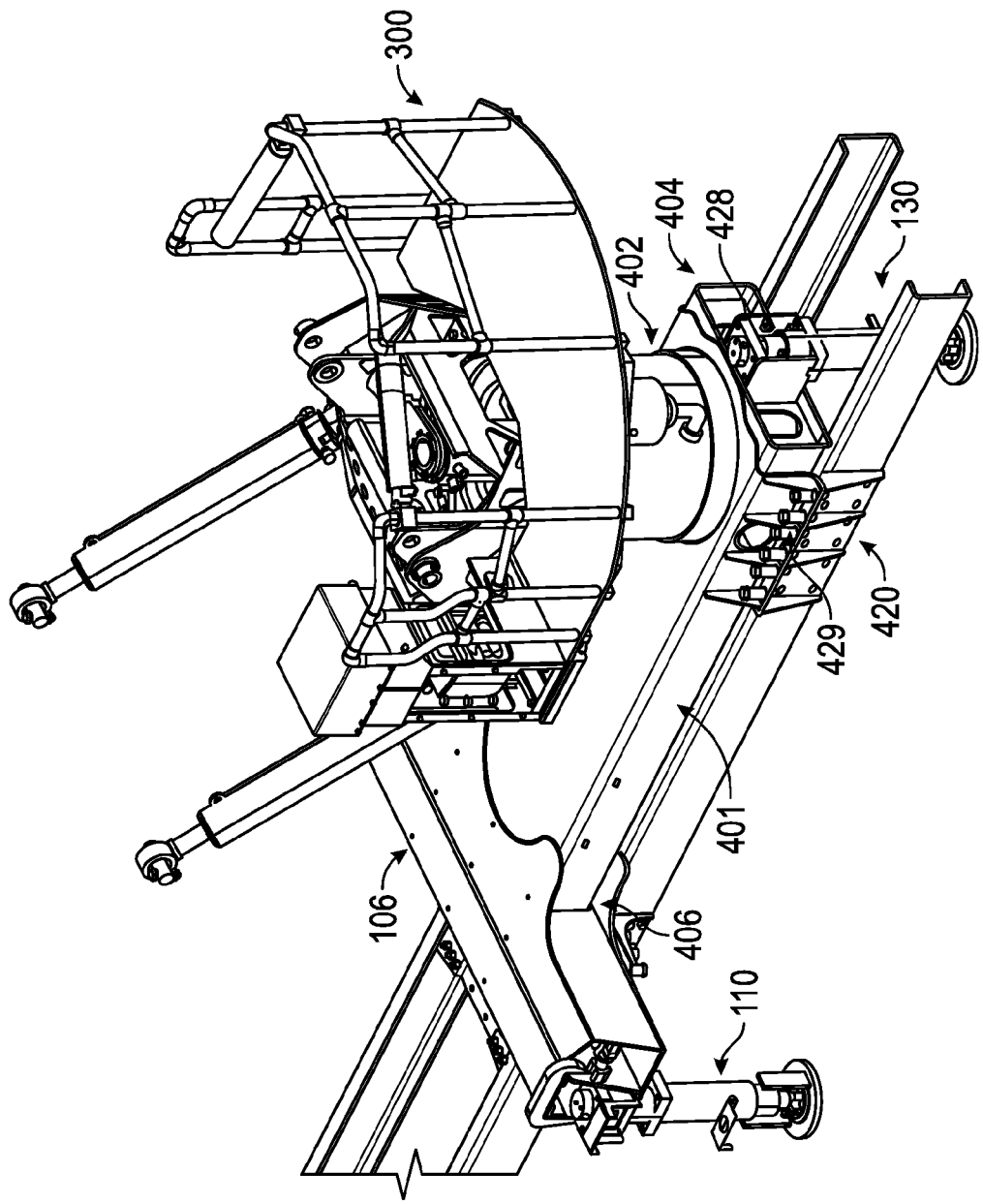
FIG. 21 is a rear perspective view of the pedestal, the torque box, and the turntable of the fire apparatus of FIG. 13, according to an exemplary embodiment.
Figure 22:
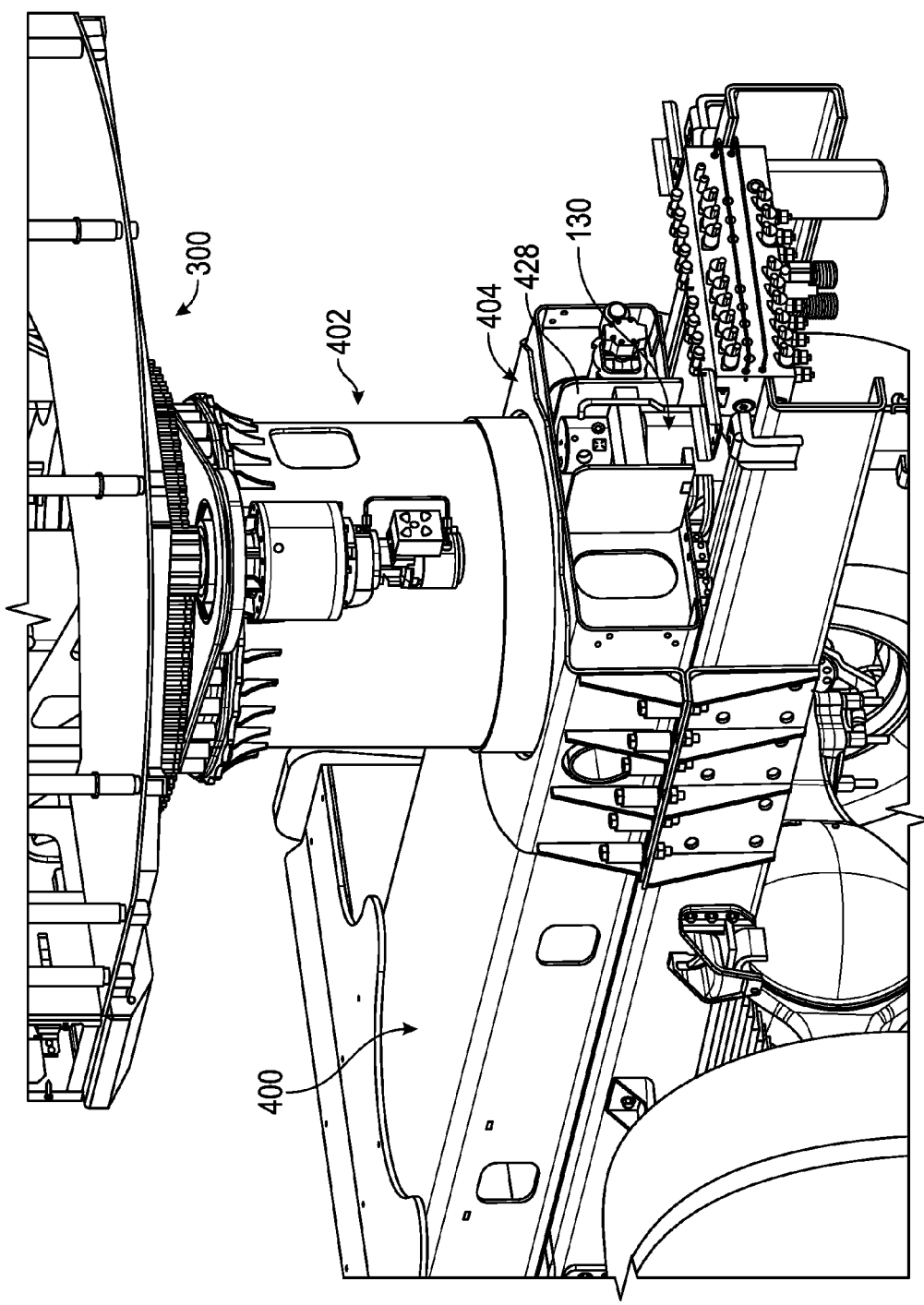
FIG. 22 is a rear perspective view of the pedestal, the torque box, and the turntable of the fire apparatus of FIG. 13, according to an exemplary embodiment.

As shown in the exemplary embodiment of FIGS. 21-22, the single stability foot 130 is coupled to the tubular component 401 via the bracket 428. An actuator (e.g., a linear actuator, rotary actuator, etc.) may extend the stability foot 130 to make contact with the ground and further stabilize the fire apparatus 10. By way of example, a second load path is defined when the stability foot 130 is in an extended position and engaged with a ground surface (e.g., street, sidewalk, etc.). For example, when a fire fighter is climbing the extended aerial ladder assembly 200, his/her weight creates a force towards the ground which causes a moment about the connection between the aerial ladder assembly 200 and the turntable 300. This loading is then transferred from the turntable 300 through the pedestal 402 and into the torque box 400. The load may then travel through the tubular component 401 of the torque box 400, along the longitudinal axis 14, and into the ground through the stability foot 130.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A quint configuration fire apparatus, comprising:
   a chassis defining a longitudinal direction and including a first frame rail spaced apart from a second frame rail, the first frame rail and the second frame rail defining a pair of frame rails;
   a single front axle coupled to a front end of the chassis;
   a single rear axle coupled to a rear end of the chassis;
   a body assembly coupled to the chassis and having a storage area configured to receive a ground ladder and a fire hose;
   a pump coupled to the chassis;
   a water tank coupled to the chassis;
   a torque box extending along the longitudinal direction and spanning the single rear axle thereby transferring loading along the chassis, the torque box including:
      a tubular body portion having a rectangular cross-sectional shape, a first end disposed rearward of the single rear axle, and an opposing second end disposed forward of the single rear axle; and
      a plate having a first wall disposed across a top surface of the tubular body portion, a first leg disposed along a sidewall of the tubular body portion, and a second leg disposed along an opposing second sidewall of the tubular body portion;
      wherein the torque box has a width equal to a spacing between laterally-outward surfaces of the first frame rail and the second frame rail;
      wherein the tubular body portion is stacked atop the pair of frame rails; and
      wherein the first leg and the second leg define a plurality of interfaces configured to engage a plurality of brackets that are attached to the pair of frame rails;
   a pedestal coupled to the torque box and disposed rearward of the single rear axle;
   a single set of outriggers coupled to the chassis and moveable between a fully extended position and a retracted position, wherein the single set of outriggers protrude from opposing lateral sides of the chassis when in the fully extended position;
   a ladder assembly including a plurality of extensible ladder sections, the ladder assembly coupled to the chassis with the pedestal and the torque box, wherein the ladder assembly is extensible to provide a horizontal reach of at least 100 feet and a vertical height of at least 105 feet; and
   a stability foot, wherein the opposing second end of the torque box is coupled to the single set of outriggers thereby defining a first load path from the ladder assembly to the single set of outriggers through the pedestal and the tubular body portion of the torque box, wherein the stability foot is coupled to the first end of the torque box thereby defining a second load path from the ladder assembly to the stability foot through the pedestal and the tubular body portion of the torque box.

2. The fire apparatus of claim 1, wherein the tubular body portion and the plate define a pair of cooperating apertures that receives the pedestal.

3. The fire apparatus of claim 1, wherein the single rear axle comprises a solid axle configuration extending laterally across the chassis.

4. The fire apparatus of claim 1, wherein the water tank is coupled to the chassis with the torque box.

5. The fire apparatus of claim 4, wherein the water tank extends along the torque box in the longitudinal direction.

6. The fire apparatus of claim 1, further comprising a hose platform disposed along a top surface of the water tank.

7. The fire apparatus of claim 1, further comprising an outrigger housing positioned at the opposing second end of the torque box.

8. The fire apparatus of claim 7, wherein the outrigger housing is configured to receive the single set of outriggers.

9. The fire apparatus of claim 7, wherein the outrigger housing includes a support that extends along the top surface of the opposing second end of the tubular body portion of the torque box.

10. The fire apparatus of claim 1, wherein the torque box further includes a cap at least partially enclosing the first end of the tubular body portion of the torque box, the cap having a bracket extending therefrom.

11. The fire apparatus of claim 10, wherein the bracket is positioned to couple the stability foot to the first end of the tubular body portion of the torque box.

12. A fire apparatus, comprising:
a chassis defining a longitudinal direction and including a first frame rail spaced apart from a second frame rail, the first frame rail and the second frame rail defining a pair of frame rails;
a body assembly coupled to the chassis and configured to receive a ground ladder, a fire hose, a pump, and a water tank;
a single rear axle coupled to a rear end of the chassis;
a torque box extending along the longitudinal direction and spanning the single rear axle thereby transferring loading along the chassis, the torque box including:
  a tubular body portion having a rectangular cross-sectional shape, a first end disposed rearward of the single rear axle, and an opposing second end disposed forward of the single rear axle; and
  a plate having a first wall disposed across a top surface of the tubular body portion, a first leg disposed along a sidewall of the tubular body portion, and a second leg disposed along an opposing second sidewall of the tubular body portion;
  wherein the torque box has a width equal to a spacing between laterally-outward surfaces of the first frame rail and the second frame rail;
  wherein the tubular body portion is stacked atop the pair of frame rails; and
  wherein the first leg and the second leg define a plurality of interfaces configured to engage a plurality of brackets that are attached to the pair of frame rails;
a pedestal coupled to the torque box and disposed rearward of the single rear axle;
a single set of outriggers coupled to the chassis and moveable between a fully extended position and a retracted position, wherein the single set of outriggers protrude from opposing lateral sides of the chassis when in the fully extended position;
a ladder assembly including a plurality of extensible ladder sections, the ladder assembly coupled to the chassis with the pedestal and the torque box, wherein the ladder assembly is extensible to provide a horizontal reach of at least 100 feet; and
a stability foot, wherein the opposing second end of the torque box is coupled to the single set of outriggers thereby defining a first load path from the ladder assembly to the single set of outriggers through the pedestal and the tubular body portion of the torque box, wherein the stability foot is coupled to the first end of the torque box thereby defining a second load path from the ladder assembly to the stability foot through the pedestal and the tubular body portion of the torque box.

13. The fire apparatus of claim 12, further comprising an outrigger housing positioned at the opposing second end of the torque box.

14. The fire apparatus of claim 13, wherein the outrigger housing is configured to receive the single set of outriggers.

15. The fire apparatus of claim 13, wherein the outrigger housing includes a support that extends along the top surface of the opposing second end of the tubular body portion of the torque box.

16. The fire apparatus of claim 12, wherein the torque box further includes a cap at least partially enclosing the first end of the tubular body portion of the torque box, the cap having a bracket extending therefrom.

17. The fire apparatus of claim 16, wherein the bracket is positioned to couple the stability foot to the first end of the tubular body portion of the torque box.

* * * * *